United States Patent
Shikata et al.

(10) Patent No.: US 9,445,084 B2
(45) Date of Patent: Sep. 13, 2016

(54) COMPUTER-READABLE STORAGE MEDIUM HAVING STORED THEREIN DISPLAY CONTROL PROGRAM, DISPLAY CONTROL APPARATUS, DISPLAY CONTROL SYSTEM, AND DISPLAY CONTROL METHOD

(75) Inventors: Hiromasa Shikata, Kyoto (JP); Shiro Mouri, Kyoto (JP); Shinji Okane, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 598 days.

(21) Appl. No.: 13/100,799

(22) Filed: May 4, 2011

(65) Prior Publication Data
US 2012/0206574 A1 Aug. 16, 2012

(30) Foreign Application Priority Data
Feb. 15, 2011 (JP) ................. 2011-029785

(51) Int. Cl.
H04N 13/02 (2006.01)
H04N 13/04 (2006.01)
H04N 13/00 (2006.01)
G06F 3/0484 (2013.01)
A63F 13/5252 (2014.01)
A63F 13/533 (2014.01)

(52) U.S. Cl.
CPC ....... H04N 13/0497 (2013.01); A63F 13/5252 (2014.09); A63F 13/533 (2014.09); G06F 3/04847 (2013.01); H04N 13/004 (2013.01); H04N 13/007 (2013.01); H04N 13/0022 (2013.01); H04N 13/0239 (2013.01); H04N 13/0404 (2013.01); H04N 13/0409 (2013.01); H04N 13/0452 (2013.01)

(58) Field of Classification Search
None
See application file for complete search history.

(56) References Cited

U.S. PATENT DOCUMENTS

| | | | |
|---|---|---|---|
| 8,605,136 B2* | 12/2013 | Yu et al. | 348/51 |
| 2005/0253924 A1* | 11/2005 | Mashitani | 348/42 |
| 2010/0220175 A1* | 9/2010 | Claydon et al. | 348/43 |
| 2011/0032252 A1 | 2/2011 | Ohta | |
| 2011/0205343 A1* | 8/2011 | Hyodo et al. | 348/54 |
| 2012/0038745 A1* | 2/2012 | Yu | H04N 13/0022 348/46 |

FOREIGN PATENT DOCUMENTS

| | | |
|---|---|---|
| JP | 2004-7396 | 1/2004 |
| JP | 2008-310696 | 12/2008 |

OTHER PUBLICATIONS

Written Opinion and European Search Report dated Apr. 15, 2014 issued in connection with European Patent Appln. No. 11164056.1.

* cited by examiner

*Primary Examiner* — Nhon Diep
(74) *Attorney, Agent, or Firm* — Nixon & Vanderhye P.C.

(57) ABSTRACT

A virtual object placed in a three-dimensional virtual space and a user interface are stereoscopically displayed on an upper LCD of a game apparatus. An image used for adjusting a display position of the user interface in the depth direction is displayed on a lower LCD. A user adjusts a UI adjustment slider by using a touch pen to adjust the parallax of the user interface. This allows the adjustment of the parallax of the user interface separately from the parallax of the three-dimensional virtual space, and thereby the depth perception of the user interface can be adjusted.

20 Claims, 17 Drawing Sheets

WHEN SLIDER 25a (HARD SLIDER) IS AT FIRST POSITION (MINIMAL PARALLAX)

WHEN SLIDER 25a (HARD SLIDER) IS AT SECOND POSITION (MAXIMAL PARALLAX)

F I G. 4
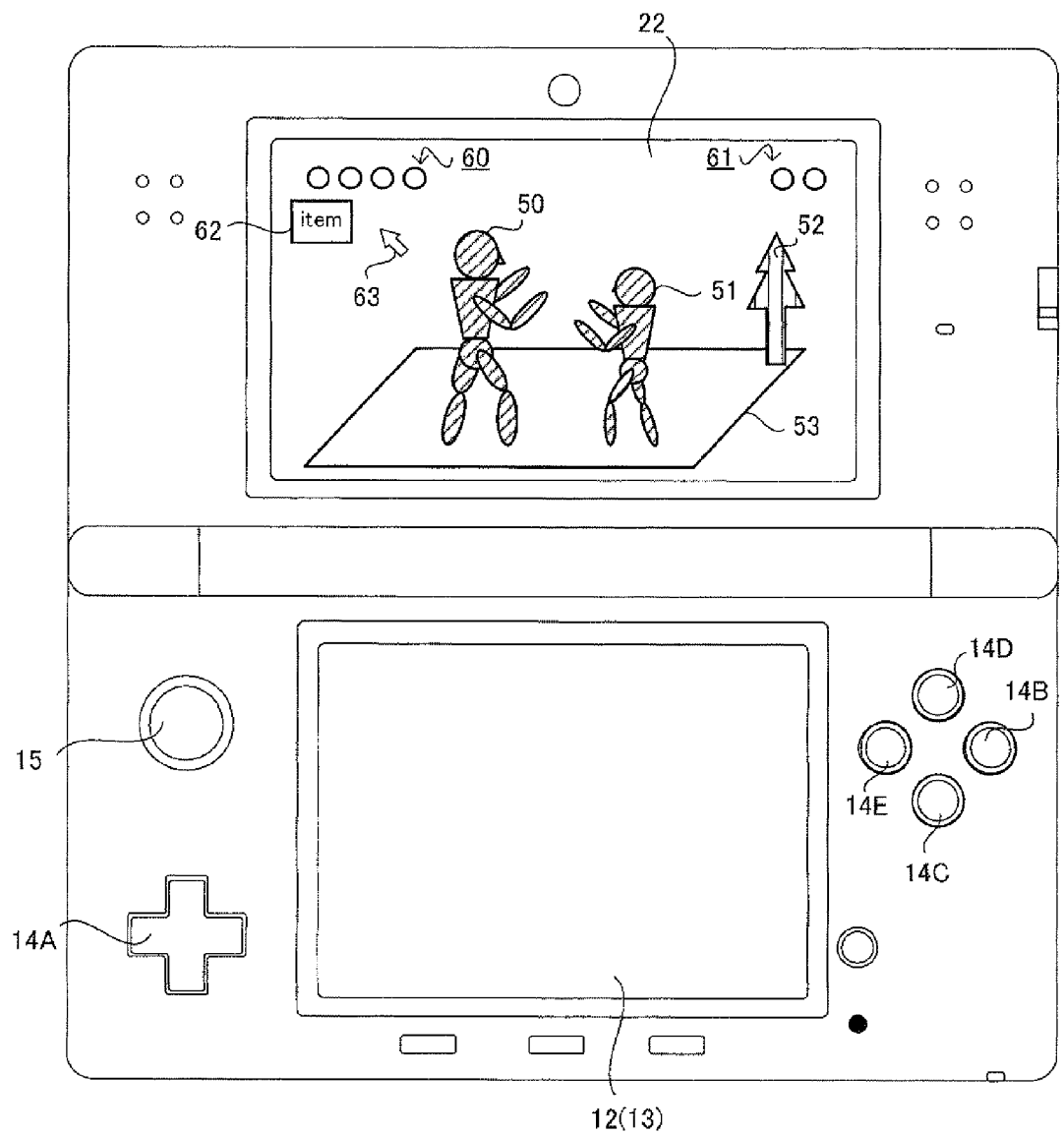

FIG. 9A
WHEN UI ADJUSTMENT SLIDER 64 (SOFT SLIDER)
IS MOVED IN LEFT DIRECTION
LEFT-EYE IMAGE A              RIGHT-EYE IMAGE B
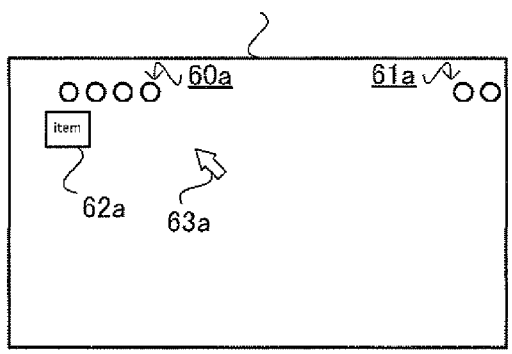 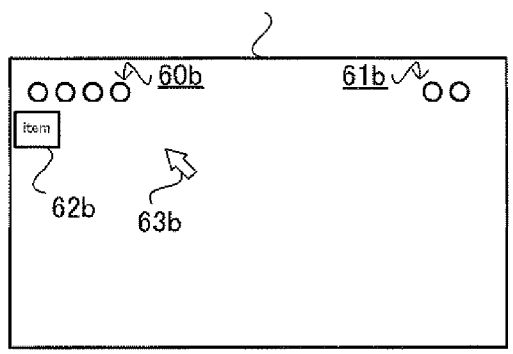
FIG. 9B
WHEN UI ADJUSTMENT SLIDER 64 (SOFT SLIDER)
IS MOVED IN RIGHT DIRECTION
LEFT-EYE IMAGE A              RIGHT-EYE IMAGE B
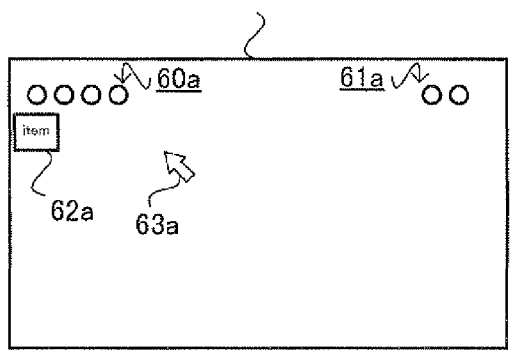 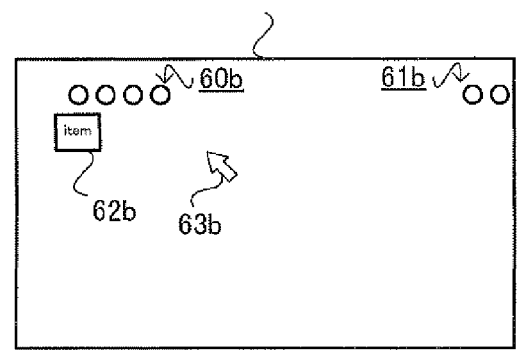

WHEN SLIDER 25a (HARD SLIDER) IS AT FIRST POSITION (MINIMAL PARALLAX)

WHEN SLIDER 25a (HARD SLIDER) IS AT SECOND POSITION (MAXIMAL PARALLAX)

F I G. 1 5
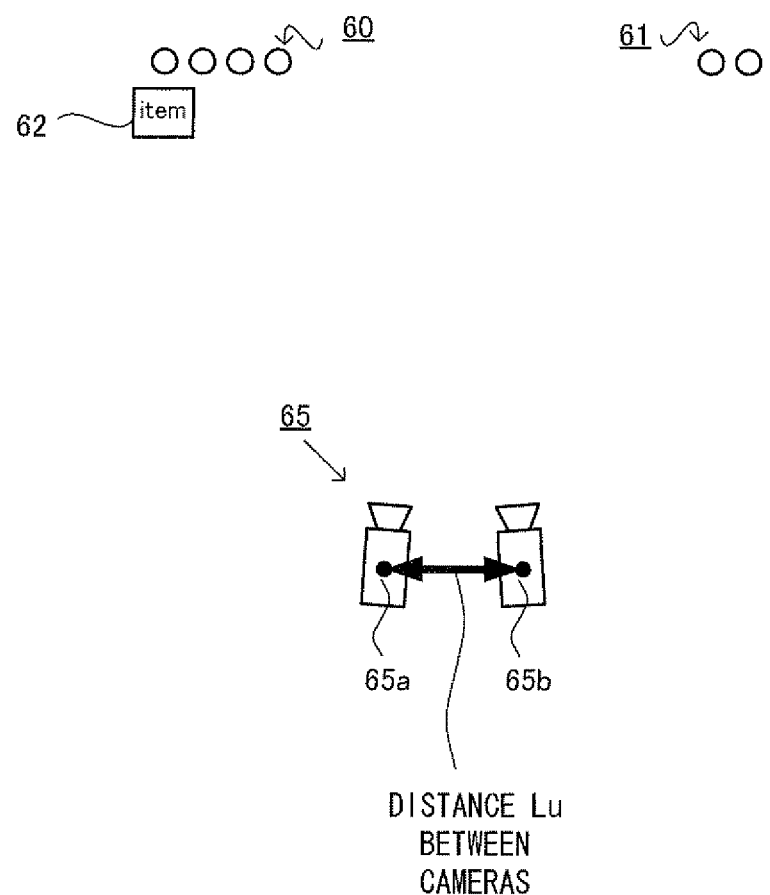

COMPUTER-READABLE STORAGE MEDIUM HAVING STORED THEREIN DISPLAY CONTROL PROGRAM, DISPLAY CONTROL APPARATUS, DISPLAY CONTROL SYSTEM, AND DISPLAY CONTROL METHOD

CROSS REFERENCE TO RELATED APPLICATION

The disclosure of Japanese Patent Application No. 2011-029785, filed on Feb. 15, 2011 is incorporated herein by reference.

FIELD

The present invention relates to a computer-readable storage medium having stored therein a display control program for displaying a stereoscopic image on a display device configured to perform stereoscopic display, a display control apparatus, a display control system, and, a display control method.

BACKGROUND AND SUMMARY

Conventionally, there are display devices which perform stereoscopic display. For example, Japanese Laid-Open Patent Publication No. 2004-7396 (hereinafter, referred to as Patent Literature 1) discloses adjustment of a parallax between a left image and a right image by a user, and which allows adjustment of stereoscopic effects of a stereoscopic image taken of a three-dimensional virtual space.

Patent Literature 1, however, has the following problems in the case where a user interface is superimposed on the three-dimensional virtual space and displayed, such as a game or the like. Even though the parallax is adjusted by the user, a parallax with respect to the user interface is a fixed parallax set by the game maker or ends up being a parallax according to the adjustment of the parallax with respect to the three-dimensional virtual space. Therefore, the user needs to change the focal length depending on the user's viewing style.

Therefore, an object of the present invention is to provide a display control technology which allows adjustment of a parallax depending on a situation so that, when a stereoscopic image is displayed, the parallax is gentle on the eyes of the user when viewing the stereoscopic image.

In order to achieve the object, the present invention employs the following features.

An embodiment of the present invention is a computer-readable storage medium having stored therein a display control program executed by a computer of a display control apparatus for displaying a three-dimensional virtual space or real space on a display device configured to perform stereoscopic display. The display control program causes the computer to function as: first acquisition means; first parallax adjustment means; second acquisition means; second parallax adjustment means; stereoscopic image generation means; and display control means. The first acquisition means acquires first input information from a user. The first parallax adjustment means adjusts a parallax of a user interface, based on the first input information acquired by the first acquisition means. The second acquisition means acquires second input information from the user. The second parallax adjustment means adjusts a parallax of the three-dimensional virtual space or real space, based on the second input information acquired by the second acquisition means.

The stereoscopic image generation means generates a stereoscopic image including an image of the user interface in which the parallax thereof is adjusted by the first parallax adjustment means, and an image of the three-dimensional virtual space or real space in which the parallax thereof is adjusted by the second parallax adjustment means. The display control means displays on the display device the stereoscopic image generated by the stereoscopic image generation means.

According to the above configuration, the parallax of the user interface can be adjusted in addition to the adjustment of the parallax of the three-dimensional virtual space or real space, in accordance with an input from the user. This allows the parallax adjustment of the user interface separately from the parallax adjustment of the three-dimensional virtual space or real space, and therefore the user is able to adjust the user interface to his/her own viewing style.

Further, in another configuration of the present invention, the first parallax adjustment means may adjust the parallax of the user interface, based on the first input information acquired by the first acquisition means and the parallax adjusted by the second parallax adjustment means for the three-dimensional virtual space or real space.

According to the above configuration, the parallax of the user interface can be adjusted based on the first input information from the user and the parallax of the adjusted three-dimensional virtual space or real space. For example, the user is able to adjust the parallax of the user interface based on the parallax of the three-dimensional virtual space or real space adjusted by the user.

Further, in another configuration of the present invention, the first parallax adjustment means may adjust the parallax of the user interface within a range based on the parallax of the three-dimensional virtual space or real space.

According to the above configuration, the range of adjustment of the user interface can be determined based on the parallax of the three-dimensional virtual space or real space.

Further, in another configuration of the present invention, the first parallax adjustment means may adjust the parallax of the user interface by setting a reference value of the parallax of the user interface in accordance with the parallax of the three-dimensional virtual space or real space, and relatively changing the reference value in accordance with the first input information acquired by the first acquisition means.

According to the above configuration, the reference value of the parallax of the user interface is determined in accordance with the parallax of the three-dimensional virtual space or real space, and the parallax of the user interface can be adjusted in accordance with the input information from the user. This allows the user to adjust the parallax of the entirety of the stereoscopic image displayed on the display device by adjusting the parallax of the three-dimensional virtual space or real space, and further allows the user to adjust the parallax of the user interface only.

Further, in another configuration of the present invention, the stereoscopic image generation means may include: first stereoscopic image generation means; and second stereoscopic image generation means. The first stereoscopic image generation means generates a first stereoscopic image in which the user interface is rendered by the parallax adjusted by the first parallax adjustment means. The second stereoscopic image generation means generates a second stereoscopic image by taking images of the three-dimensional virtual space by a virtual stereo camera or taking images of the real space by a stereo camera. The stereoscopic image generation means generates the stereoscopic image by superimposing the first stereoscopic image and the second stereoscopic image one on the other.

According to the above configuration, the stereoscopic image can be generated by superimposing the first stereoscopic image in which the user interface is rendered and the second stereoscopic image taken, by the virtual stereo camera, of the three-dimensional virtual space one on the other. This allows the user interface to be displayed with a parallax different from the parallax of the three-dimensional virtual space.

Further, in another configuration of the present invention, the first stereoscopic image generation means may generate the first stereoscopic image by taking images of the user interface by a UI virtual stereo camera.

According to the above configuration, the first stereoscopic image taken of only the user interface can be generated by taking the images of the user interface by the UI virtual stereo camera.

Further, in another configuration of the present invention, the first parallax adjustment means may adjust the parallax of the user interface by setting, based on the first input information, a distance between virtual cameras at the left and at the right which are components of the UI virtual stereo camera.

According to the above configuration, the parallax of the user interface can be set by adjusting the distance between the cameras at the left and at the right which are the components of the UI virtual stereo camera.

Further, in another configuration of the present invention, the stereoscopic image generation means may generate the stereoscopic image by superimposing the first stereoscopic image on a front side of the second stereoscopic image.

According to the above configuration, since the first stereoscopic image taken of the user interface is superimposed on the front side of the second stereoscopic image, the user interface can always be displayed on the screen.

Further, in another configuration of the present invention, the first parallax adjustment means may adjust the parallax of the user interface by placing the user interface in the three-dimensional virtual space, based on the first input information. The stereoscopic image generation means generates the stereoscopic image by taking, by a virtual stereo camera, images of the three-dimensional virtual space in which the user interface is placed by the first parallax adjustment means.

According to the above configuration, the stereoscopic image taken of the three-dimensional virtual space including the user interface can be generated by placing the user interface in the three-dimensional virtual space.

Further, in another configuration of the present invention, a predetermined virtual object may be placed in the three-dimensional virtual space. The stereoscopic image generation means generates the stereoscopic image, as if, when seen from the virtual stereo camera, the user interface is positioned in front of the virtual object even when the user interface is positioned behind the virtual object.

According to the above configuration, the user interface can always be displayed on the screen.

Further, in another configuration of the present invention, when the parallax of the user interface is adjusted by the first parallax adjustment means, the display control program may further cause the computer to function as reference display means for displaying a reference display used in adjusting the parallax of the user interface.

According to the above configuration, when the parallax of the user interface is adjusted, the reference of the adjustment can be displayed on the display device configured to perform stereoscopic display (or another display device). This allows the user to easily adjust the parallax of the user interface.

Further, in another configuration of the present invention, the reference display means may display on the display device an auxiliary plane, as the reference display used in adjusting the parallax of the user interface, the auxiliary plane indicating a display position of the user interface in a direction perpendicular to a screen of the display device.

According to the above configuration, the auxiliary plane is displayed together with the user interface, and therefore the user can easily adjust the parallax of the user interface.

Further, in the present invention, the display control apparatus may be the realization of the means described above. Alternatively, in the present invention, a plurality of aspects, which realize the above means, may interact with one another, thereby being configured as one display control system. The display control system may be configured of a single apparatus, or may be configured of a plurality of apparatuses.

According to the present invention, the parallax of the user interface can be adjusted to the user's viewing style.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram showing an example of a game image displayed on a screen of an upper LCD 22 while a game according to the present embodiment is being executed;

FIG. 9A is a diagram showing a left-eye image and a right-eye image in the case where the UI adjustment slider 64 is moved in the left direction;

FIG. 9B is a diagram showing the left-eye image and the right-eye image in the case where the UI adjustment slider 64 is moved in the right direction;

FIG. 15 is a diagram showing how images of the user interfaces 60 through 63 are taken by a UI virtual stereo camera 65;

DESCRIPTION OF THE PREFERRED EMBODIMENTS (Structure of Game Apparatus)

Figure 1:
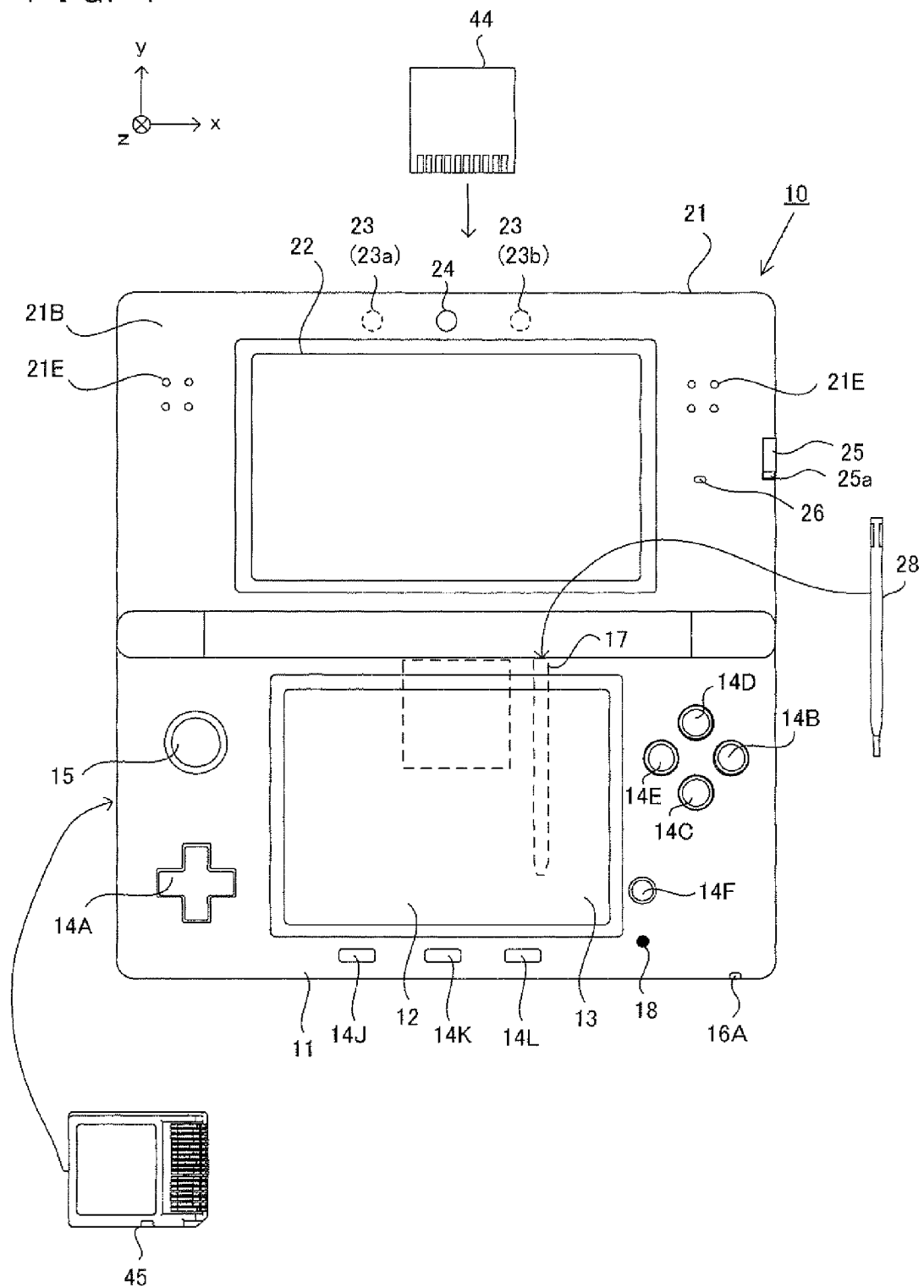
FIG. 1 is a front view showing an external of a game apparatus 10 in an opened state.
Figure 2:
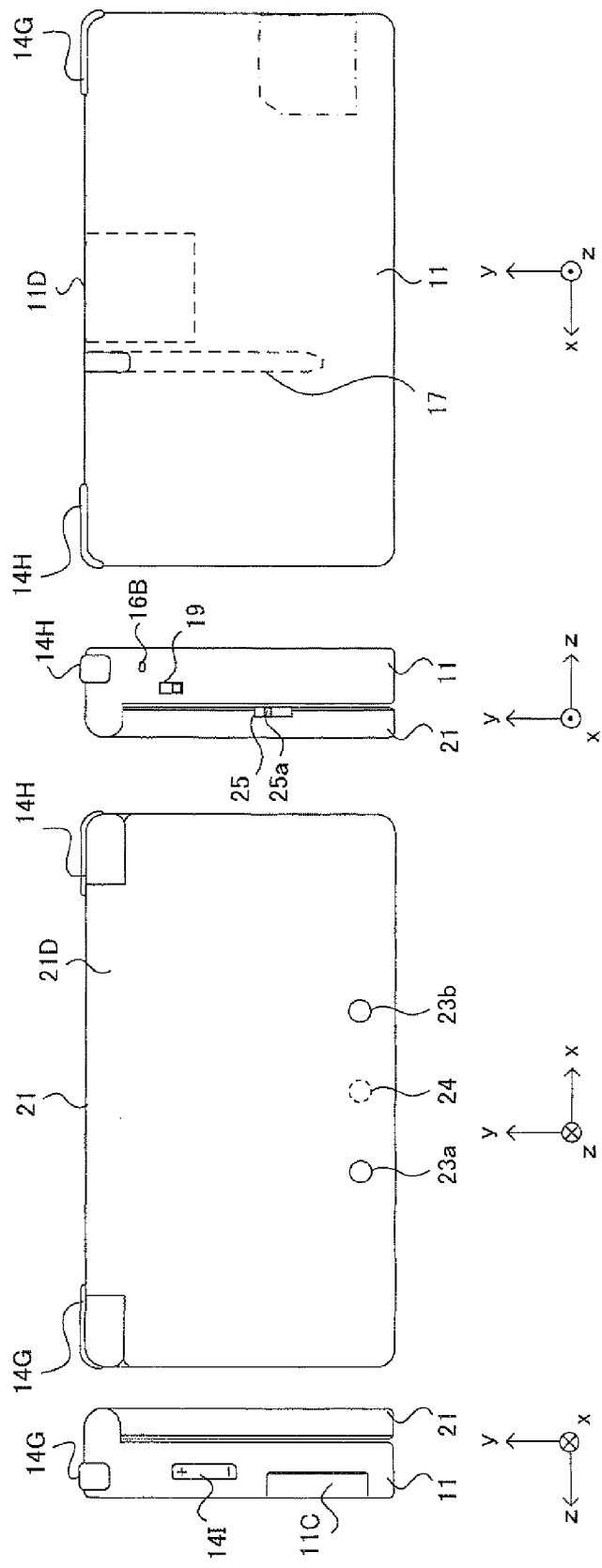
FIG. 2A is a left side view of the game apparatus 10 in a closed state.
FIG. 2B is a front view of the game apparatus 10 in the closed state.
FIG. 2C is a right side view of the game apparatus 10 in the closed state.
FIG. 2D is a rear view of the game apparatus 10 in the closed state.

Hereinafter, a game apparatus according to an embodiment of the present invention will be described. FIG. 1 is a front view showing an external view of a game apparatus 10 in an opened state. FIG. 2A is a left side view of the game apparatus 10 in a closed state, FIG. 2B is a front view of the game apparatus 10 in the closed state, FIG. 2C is a right side view of the game apparatus 10 in the closed state, and FIG. 2D is a rear view of the game apparatus 10 in the closed state. The game apparatus 10 is a hand-held game apparatus, and is configured to be foldable as shown in FIG. 1 to FIG. 2D. FIG. 1 shows the game apparatus 10 in the opened state and FIG. 2A to 2D each show the game apparatus 10 in the closed state. The game apparatus 10 is able to take an image by an imaging section, display the taken image on a screen, and store data of the taken image. The game apparatus 10 can execute a game program which is stored in an exchangeable memory card or a game program which is received from a server or another game apparatus, and can display, on the screen, an image generated by computer graphics processing, such as an image taken by a virtual camera set in a virtual space, for example.

Initially, an external structure of the game apparatus 10 will be described with reference to FIG. 1 to FIG. 2D. The game apparatus 10 includes a lower housing 11 and an upper housing 21 as shown in FIG. 1 to FIG. 2D. The lower housing 11 and the upper housing 21 are connected to each other so as to be openable and closable (foldable).

(Description of Lower Housing)

Initially, a structure of the lower housing 11 will be described. As shown in FIG. 1 to FIG. 2D, a lower LCD (Liquid Crystal Display) 12, a touch panel 13, operation buttons 14A to 14L, an analog stick 15, an LED 16A and an LED 16B, an insertion opening 17, and a microphone hole 18 are provided in the lower housing 11. Hereinafter, these components will be described in detail.

As shown in FIG. 1, the lower LCD 12 is accommodated in the lower housing 11. The number of pixels of the lower LCD 12 may be, for example, 320 dots×240 dots (the horizontal line×the vertical line). The lower LCD 12 is a display device for displaying an image in a planar manner (not in a stereoscopically visible manner), which is different from the upper LCD 22 described below. Although an LCD is used as a display device in the present embodiment, any other display device such as a display device using an EL (Electro Luminescence) or the like, may be used. In addition, a display device having any resolution may be used as the lower LCD 12.

As shown in FIG. 1, the game apparatus 10 includes the touch panel 13 as an input device. The touch panel 13 is mounted on the screen of the lower LCD 12. In the present embodiment, the touch panel 13 is, but is not limited to, a resistive film type touch panel. A touch panel of any type such as electrostatic capacitance type may be used. In the present embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by dashed line in FIG. 1 and FIG. 2D) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14L are each an input device for making a predetermined input. As shown in FIG. 1, among the operation buttons 14A to 14L, a cross button 14A (a direction input button 14A), a button 14B, a button 14C, a button 14D, a button 14E, a power button 14F, a selection button 14J, a HOME button 14K, and a start button 14L are provided on the inner side surface (main surface) of the lower housing 11. The cross button 14A has a cross shape, and includes buttons for indicating an upward, a downward, a leftward, or a rightward direction. The buttons 14A to 14E, the selection button 14J, the HOME button 14K, and the start button 14L are assigned functions, respectively, as necessary, in accordance with a program executed by the game apparatus 10. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction. The analog stick 15 has a top, corresponding to a key, which is configured to slide parallel to the inner side surface of the lower housing 11. The analog stick 15 acts in accordance with a program executed by the game apparatus 10. For example, when a game in which a predetermined object emerges in a three-dimensional virtual space is executed by the game apparatus 10, the analog stick 15 acts as an input device for moving the predetermined object in the three-dimensional virtual space. In this case, the predetermined object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

Further, the microphone hole 18 is provided on the inner side surface of the lower housing 11. Under the microphone hole 18, a microphone 42 (see FIG. 3) is provided as a sound input device described below, and the microphone 42 detects for a sound from the outside of the game apparatus 10.

As shown in FIG. 2B and FIG. 2D, an L button 14G and an R button 14H are provided on the upper side surface of the lower housing 11. The L button 14G and the R button 14H act as shutter buttons (imaging instruction buttons) of the imaging section, for example. Further, as shown in FIG. 2A, a sound volume button 14I is provided on the left side surface of the lower housing 11. The sound volume button 14I is used for adjusting a sound volume of a speaker of the game apparatus 10.

As shown in FIG. 2A, a cover section 11C is provided on the left side surface of the lower housing 11 so as to be openable and closable. Inside the cover section 11C, a connector (not shown) is provided for electrically connecting between the game apparatus 10 and an external data storage memory 45. The external data storage memory 45 is detachably connected to the connector. The external data storage memory 45 is used for, for example, recording (storing) data of an image taken by the game apparatus 10.

Further, as shown in FIG. 2D, an insertion opening 11D, through which an external memory 44 having a game program stored therein is inserted, is provided on the upper side surface of the lower housing 11, and a connector (not shown) for electrically connecting between the game apparatus 10 and the external memory 44 in a detachable manner is provided inside the insertion opening 11D. A predetermined game program is executed by connecting the external memory 44 to the game apparatus 10.

Further, as shown in FIG. 1 and FIG. 2C, the first LED 16A for notifying a user of an ON/OFF state of a power supply of the game apparatus 10 is provided on the lower side surface of the lower housing 11, and the second LED 16B for notifying a user of an establishment state of a wireless communication of the game apparatus 10 is provided on the right side surface of the lower housing 11. The game apparatus 10 can make wireless communication with other devices, and the second LED 16B is lit up when the wireless communication is established. The game apparatus 10 has a function of connecting to a wireless LAN in a method based on, for example, IEEE 802.11.b/g standard. A wireless switch 19 for enabling/disabling the function of the wireless communication is provided on the right side surface of the lower housing 11 (see FIG. 2C).

A rechargeable battery (not shown) acting as a power supply for the game apparatus 10 is accommodated in the lower housing 11, and the battery can be charged through a terminal provided on a side surface (for example, the upper side surface) of the lower housing 11.

(Description of Upper Housing)

Next, a structure of the upper housing 21 will be described. As shown in FIG. 1 to FIG. 2D, in the upper housing 21, an upper LCD (Liquid Crystal Display) 22, an outer imaging section 23 (an outer imaging section (left) 23a and an outer imaging section (right) 23b), an inner imaging section 24, a 3D adjustment switch 25, and a 3D indicator 26 are provided. Hereinafter, these components will be described in detail.

As shown in FIG. 1, the upper LCD 22 is accommodated in the upper housing 21. The number of pixels of the upper LCD 22 may be, for example, 800 dots×240 dots (the horizontal line×the vertical line). Although, in the present embodiment, the upper LCD 22 is an LCD, a display device using, for example, an EL (Electro Luminescence), or the like may be used. In addition, a display device having any resolution may be used as the upper LCD 22.

The upper LCD 22 is a display device capable of displaying a stereoscopically visible image. Further, in the present embodiment, a left-eye image and a right-eye image are displayed by using substantially the same display area. Specifically, the upper LCD 22 is a display device using a method in which the left-eye image and the right-eye image are alternately displayed in the horizontal direction in predetermined units (for example, every other line). Alternatively, the upper LCD 22 may be a display device using a method in which the left-eye image and the right-eye image are alternately displayed for a predetermined time period and the left-eye image and the right-eye image are viewed by the user's left eye and the right eye, respectively, by using glasses. In the present embodiment, the upper LCD 22 is a display device capable of displaying an image which is stereoscopically visible by the naked eye, and a lenticular lens type display device or a parallax barrier type display device is used which enables the left-eye image and the right eye image, which are alternately displayed in the horizontal direction, to be separately viewed by the left eye and right eye, respectively. In the present embodiment, the upper LCD 22 of a parallax barrier type is used. The upper LCD 22 displays, by using the right-eye image and the left eye image, an image (a stereoscopic image) which is stereoscopically visible by the naked eye. That is, the upper LCD 22 allows a user to view the left-eye image with her/his left eye, and the right-eye image with her/his right eye by utilizing a parallax barrier, so that a stereoscopic image (a stereoscopically visible image) exerting a stereoscopic effect on a user can be displayed. Further, the upper LCD 22 may disable the parallax barrier. When the parallax barrier is disabled, an image can be displayed in a planar manner (it is possible to display a planar visible image which is different from a stereoscopically visible image as described above. That is, a display mode is used in which the same displayed image is viewed with the left eye and the right eye.). Thus, the upper LCD 22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch 25 described below.

Two imaging sections (23a and 23b) provided on the outer side surface (the back surface reverse of the main surface on which the upper LCD 22 is provided) 21D of the upper housing 21 are generically referred to as the outer imaging section 23. The imaging directions of the outer imaging section (left) 23a and the outer imaging section (right) 23b are each the same as the outward normal direction of the outer side surface 21D. The outer imaging section (left) 23a and the outer imaging section (right) 23b can be used as a stereo camera depending on a program executed by the game apparatus 10. Each of the outer imaging section (left) 23a and the outer imaging section (right) 23b includes an imaging device, such as a CCD image sensor or a CMOS image sensor, having a common predetermined resolution, and a lens. The lens may have a zooming mechanism.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens. The lens may have a zooming mechanism.

The 3D adjustment switch 25 is a slide switch, and is used for switching a display mode of the upper LCD 22 as described above. Further, the 3D adjustment switch 25 is used for adjusting the stereoscopic effect of a stereoscopically visible image (stereoscopic image) which is displayed on the upper LCD 22. A slider 25a of the 3D adjustment switch 25 is slidable to any position in a predetermined direction (along the longitudinal direction of the right side surface), and a display mode of the upper LCD 22 is determined in accordance with the position of the slider 25a. Further, a manner in which the stereoscopic image is visible is adjusted in accordance with the position of the slider 25a. Specifically, an amount of shift of the right-eye image and the left-eye image in the horizontal direction is adjusted in accordance with the position of the slider 25a.

The 3D indicator 26 indicates whether or not the upper LCD 22 is in the stereoscopic display mode. The 3D indicator 26 is implemented as an LED, and is lit up when the stereoscopic display mode of the upper LCD 22 is enabled. The 3D indicator 26 may be lit up only when the program processing for displaying a stereoscopically visible image is performed in a state where the upper LCD 22 is in the stereoscopic display mode.

Further, a speaker hole 21E is provided on the inner side surface of the upper housing 21. A sound from a speaker 43 described below is outputted through the speaker hole 21E.

(Internal Configuration of Game Apparatus 10)

Figure 3:
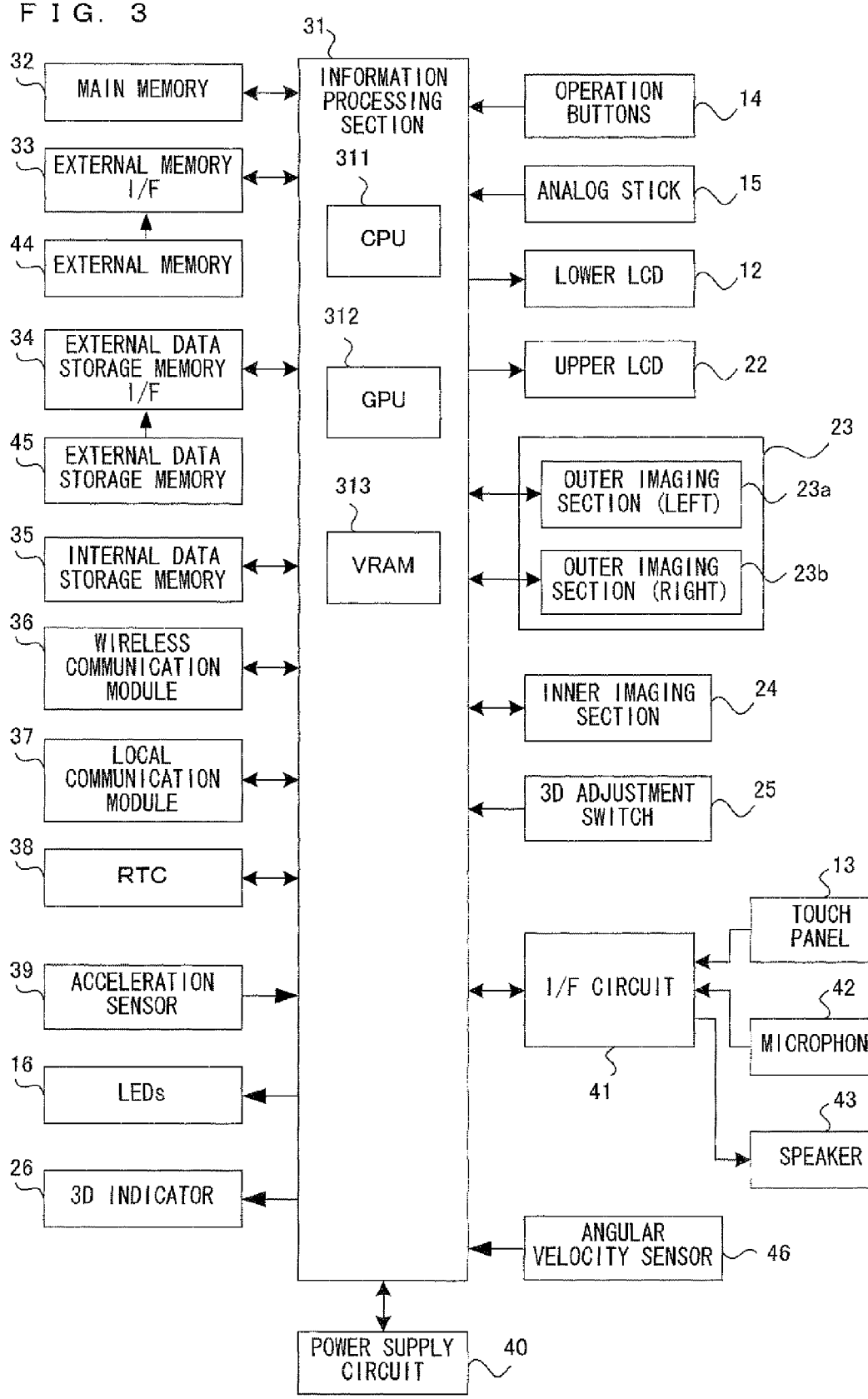
FIG. 3 is a block diagram illustrating an internal configuration of the game apparatus 10.

Next, an internal electrical configuration of the game apparatus 10 will be described with reference to FIG. 3. FIG. 3 is a block diagram illustrating an internal configuration of the game apparatus 10. As shown in FIG. 3, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, a power supply circuit 40, an interface circuit (I/F circuit) 41. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. The CPU 311 of the information processing section 31 executes a process according to the program by executing a program stored in a memory (for example, the external memory 44 connected to the external memory I/F 33 or the internal data storage memory 35) inside the game apparatus 10. The program executed by the CPU 311 of the information processing section 31 may be acquired from another device through communication with the other device. The information processing section 31 further includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12.

To the information processing section 31, the main memory 32, the external memory I/F 33, the external data storage memory I/F 34, and the internal data storage memory 35 are connected. The external memory I/F 33 is an interface for detachably connecting to the external memory 44. The external data storage memory I/F 34 is an interface for detachably connecting to the external data storage memory 45.

The main memory 32 is volatile storage means used as a work area and a buffer area for (the CPU 311 of) the information processing section 31. That is, the main memory 32 temporarily stores various types of data used for the process based on the program, and temporarily stores a program acquired from the outside (the external memory 44, another device, or the like), for example. In the present embodiment, for example, a PSRAM (Pseudo-SRAM) is used as the main memory 32.

The external memory 44 is nonvolatile storage means for storing a program executed by the information processing section 31. The external memory 44 is implemented as, for example, a read-only semiconductor memory. When the external memory 44 is connected to the external memory I/F 33, the information processing section 31 can load a program stored in the external memory 44. A predetermined process is performed by the program loaded by the information processing section 31 being executed. The external data storage memory 45 is implemented as a non-volatile readable and writable memory (for example, a NAND flash memory), and is used for storing predetermined data. For example, images taken by the outer imaging section 23 and/or images taken by another device are stored in the external data storage memory 45. When the external data storage memory 45 is connected to the external data storage memory I/F 34, the information processing section 31 loads an image stored in the external data storage memory 45, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through wireless communication via the wireless communication module 36 are stored in the internal data storage memory 35.

The wireless communication module 36 has a function of connecting to a wireless LAN by using a method based on, for example, IEEE 802.11.b/g standard. The local communication module 37 has a function of performing wireless communication with a game apparatus of the same type by using a predetermined communication method (for example, communication through a unique protocol, or infrared communication). The wireless communication module 36 and the local communication module 37 are connected to the information processing section 31. The information processing section 31 can perform data transmission to and data reception from another device via the Internet by using the wireless communication module 36, and can perform data transmission to and data reception from another game apparatus of the same type by using the local communication module 37.

The acceleration sensor 39 is connected to the information processing section 31. The acceleration sensor 39 detects magnitudes of accelerations (linear accelerations) in directions of straight lines along three axial (xyz axial) directions, respectively. The acceleration sensor 39 is provided inside the lower housing 11. In the acceleration sensor 39, as shown in FIG. 1, the long side direction of the lower housing 11 is defined as the x axial direction, the short side direction of the lower housing 11 is defined as the y axial direction, and the direction orthogonal to the inner side surface (main surface) of the lower housing 11 is defined as the z axial direction, thereby detecting magnitudes of the linear accelerations for the respective axes. The acceleration sensor 39 is, for example, an electrostatic capacitance type acceleration sensor. However, another type of acceleration sensor may be used. The acceleration sensor 39 may be an acceleration sensor for detecting a magnitude of acceleration for one axial direction or two axial directions. The information processing section 31 can receive data (acceleration data) representing accelerations detected by the acceleration sensor 39, and detect an orientation and a motion of the game apparatus 10.

The RTC 38 and the power supply circuit 40 are connected to the information processing section 31. The RTC 38 counts time and outputs the time to the information processing section 31. The information processing section 31 calculates a current time (date), based on the time counted by the RTC 38. The power supply circuit 40 controls power from the power supply (the rechargeable battery accommodated in the lower housing 11 as described above) of the game apparatus 10, and supplies power to each component of the game apparatus 10.

The I/F circuit 41 is connected to the information processing section 31. The microphone 42 and the speaker 43 are connected to the I/F circuit 41. Specifically, the speaker 43 is connected to the I/F circuit 41 through an amplifier (not shown). The microphone 42 detects user's voice, and outputs a sound signal to the I/F circuit 41. The amplifier amplifies the sound signal outputted from the I/F circuit 41, and a sound is outputted from the speaker 43. The touch panel 13 is connected to the I/F circuit 41. The I/F circuit 41 includes a sound control circuit for controlling the microphone 42 and the speaker 43 (amplifier), and a touch panel control circuit for controlling the touch panel. The sound control circuit performs A/D conversion and D/A conversion on the sound signal, and converts the sound signal to a predetermined form of sound data, for example. The touch panel control circuit generates a predetermined form of touch position data, based on a signal outputted from the touch panel 13, and outputs the touch position data to the information processing section 31. The touch position data represents a coordinate of a position on which an input is made on an input surface of the touch panel 13. The touch panel control circuit reads a signal outputted from the touch panel 13, and generates the touch position data every predetermined time. The information processing section 31 acquires the touch position data to recognize a position on which an input is made on the touch panel 13.

The operation button 14 includes the operation buttons 14A to 14L described above, and is connected to the information processing section 31. Operation data representing an input state of each of the operation buttons 14A to 14I is outputted from the operation button 14 to the information processing section 31, and the input state indicates whether or not each of the operation buttons 14A to 14I has been pressed. The information processing section 31 acquires the operation data from the operation button 14 to perform a process in accordance with the input on the operation button 14.

The lower LCD 12 and the upper LCD 22 are connected to the information processing section 31. The lower LCD 12 and the upper LCD 22 each display an image in accordance with an instruction from (the GPU 312 of) the information processing section 31. In the present embodiment, the information processing section 31 displays a stereoscopic image (stereoscopically visible image) on the upper LCD 22.

Specifically, the information processing section 31 is connected to an LCD controller (not shown) of the upper LCD 22, and causes the LCD controller to set the parallax barrier to ON or OFF. When the parallax barrier is set to ON in the upper LCD 22, a right-eye image and a left-eye image, which are stored in the VRAM 313 of the information processing section 31, are outputted to the upper LCD 22. More specifically, the LCD controller alternately repeats reading of pixel data of the right-eye image for one line in the vertical direction, and reading of pixel data of the left-eye image for one line in the vertical direction, thereby reading, from the VRAM 313, the right-eye image and the left-eye image. Thus, an image to be displayed is divided into the right-eye images and the left-eye images each of which is a rectangle-shaped image having one line of pixels aligned in the vertical direction, and an image, in which the rectangle-shaped image for the left eye which is obtained through the division, and the rectangle-shaped right-eye image which is obtained through the division are alternately aligned, is displayed on the screen of the upper LCD 22. A user views the images through the parallax barrier in the upper LCD 22, so that the right-eye image is viewed with the user's right eye, and the left-eye image is viewed with the user's left eye. Thus, the stereoscopically visible image is displayed on the screen of the upper LCD 22.

The outer imaging section 23 and the inner imaging section 24 are connected to the information processing section 31. The outer imaging section 23 and the inner imaging section 24 each take an image in accordance with an instruction from the information processing section 31, and output data of the taken image to the information processing section 31.

The 3D adjustment switch 25 is connected to the information processing section 31. The 3D adjustment switch 25 transmits to the information processing section 31 an electrical signal in accordance with the position of the slider 25a.

The 3D indicator 26 is connected to the information processing section 31. The information processing section 31 controls whether or not the 3D indicator 26 is to be lit up. For example, the information processing section 31 lights up the 3D indicator 26 when the upper LCD 22 is in the stereoscopic display mode.

Further, the angular velocity sensor 46 is connected to the information processing section 31. The angular velocity sensor 46 detects an angular velocity about each axis (x axis, y axis, and z axis). The game apparatus 10 can calculate an orientation of the game apparatus 10 in real space, in accordance with an angular velocity sequentially detected by the angular velocity sensor 46. Specifically, the game apparatus 10 can calculate an angle of rotation of the game apparatus 10 about each axis by integrating, with time, the angular velocity about each axis, which is detected by the angular velocity sensor 46. This is the end of the description of the internal configuration of the game apparatus 10.

(Outline of Display Process)

Next, an outline of a display process according to the present embodiment will be described with reference to FIG. 4 through FIG. 11B. In the present embodiment, it is assumed that a game image as shown in FIG. 4 is displayed on the upper LCD 22. FIG. 4 is a diagram showing an example of a game image displayed on the upper LCD 22 while the game according to the present embodiment is being executed.

As shown in FIG. 4, a player character 50, an enemy character 51, a tree object 52, a ground object 53, a user interface 60, a user interface 61, a user interface 62, and a cursor 63 (a pointer) are displayed on the upper LCD 22. In the game according to the present embodiment, the player character 50 and the enemy character 51 fight against each other by an operation being performed by using the buttons (such as buttons 14A through 14E) or the analog stick 15 (called a button operation), or a touch operation being performed on the touch panel 13 (the lower LCD 12).

The player character 50 and the enemy character 51 are three-dimensional virtual characters placed in the three-dimensional virtual space. The player character 50 is a virtual object which is operated by the user and the enemy character 51 is a virtual object which is operated by the game apparatus 10. The tree object 52 is a virtual object which represents a tree placed in the virtual space. The ground object 53 is a virtual object which indicates a ground in the virtual space, and is a type of background object. The player character 50 and the enemy character 51 fight against each other while moving on the ground object 53.

The user interface 60 is a user interface used for displaying life power of the player character 50. The user interface 61 is a user interface used for displaying life power of the enemy character 51. The user interface 60 and the user interface 61 are each an image of, for example, a plurality of circles and, when one character is attacked by the other character, the number of the plurality of circles included in the user interface of the attacked character decreases one by one. When the circles included in the user interface 60 is reduced to 0, the player character 50 loses the game and the game ends.

Figure 5:
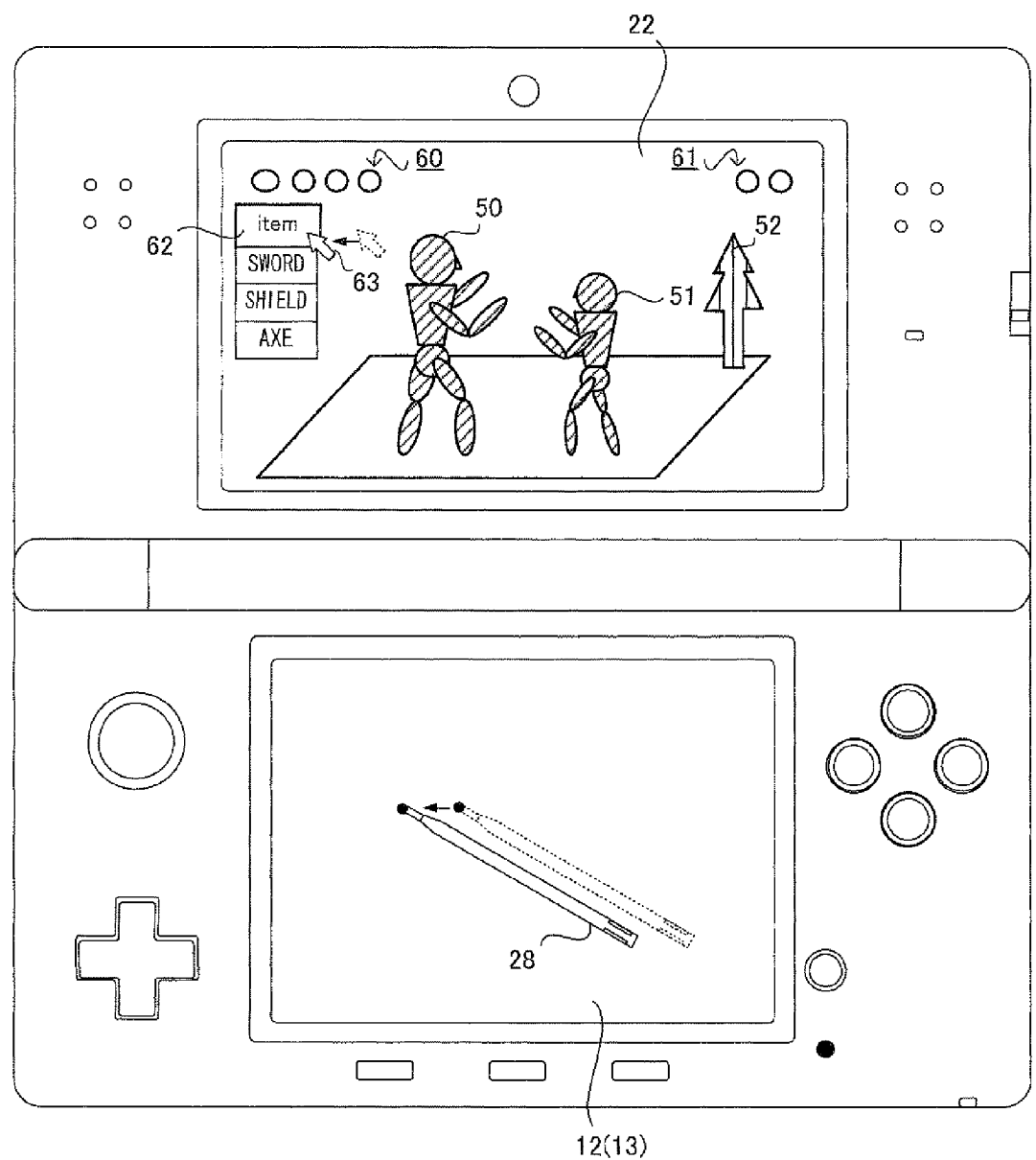
FIG. 5 is a diagram showing a state in which a list of items is displayed in the case where a cursor 63 is moved over a user interface 62.

The user interface 62 is an icon which allows the user to select an item available for the player character 50. The cursor 63 is a type of user interface and indicates a position designated by the user on the screen of the upper LCD 22. The user can move the cursor 63 by using the cross button 14A or the analog stick 15, or move the cursor 63 by performing a touch operation on the touch panel 13. FIG. 5 is a diagram showing a state in which a list of items is displayed in the case where the cursor 63 is moved over the user interface 62. As shown in FIG. 5, if the touch pen 28 is used to touch the touch panel 13 and slid in the horizontal direction while the touch panel 13 is being touched, the cursor 63, which is displayed on the upper LCD 22, moves in the horizontal direction. Then, when the cursor 63 moves over the user interface 62, a list of selectable items is displayed. When the user selects a predetermined item out of the displayed list of items by using the cursor 63, the user can cause the player character 50 to attack the enemy character 51, using the selected item.

As described above, the upper LCD 22 is a display device capable of performing stereoscopic display, and the image displayed on the upper LCD 22 is a stereoscopic image. That is, the right-eye image and the left-eye image which have the parallax therebetween are displayed on the upper LCD 22.

Here, the parallax refers to a difference in shape, position and direction of an object figure which occurs when the same object is seen from different positions, and refers to a difference in object included in the right-eye image and the left-eye image. The user views the left-eye image and the right-eye image through the parallax barrier in the upper LCD 22 with the user's left eye and right eye, respectively, and thereby the user is able to stereoscopically view the image displayed on the upper LCD 22. For example, when the user sees the screen of the upper LCD 22, it appears as if the player character 50 and the enemy character 51 are present at a predetermined position in front of the screen and the tree object 52 is present at a predetermined position in the depth direction of the screen. Further, it appears, for example, as if the user interfaces 60, 61, 62 and the cursor 63, which is a type of user interface, are present on the screen of the upper LCD 22. Hereinafter, the user interfaces 60, 61, and 62, and the cursor 63 are collectively described as the user interfaces 60 through 63.

Figure 6:
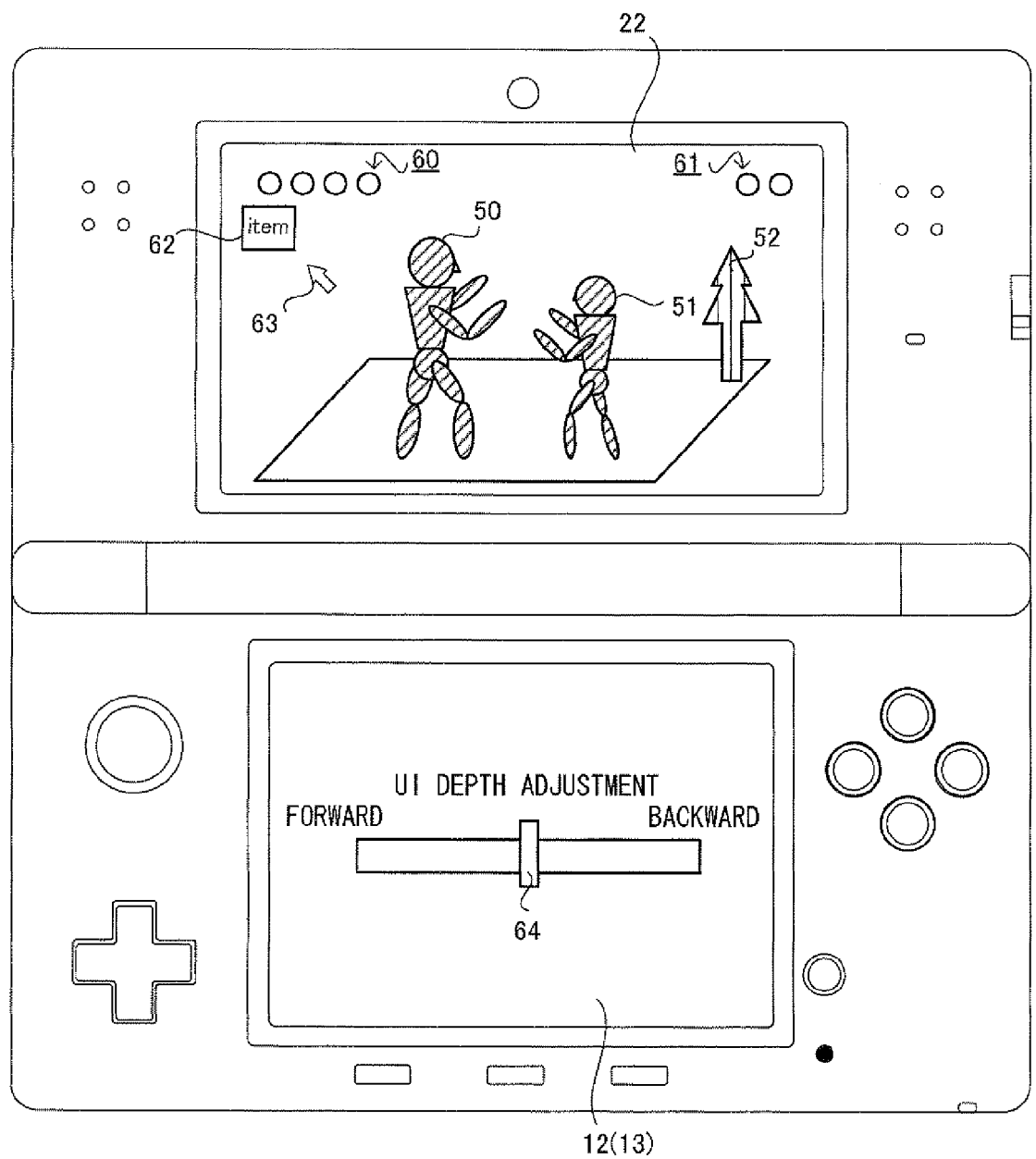
FIG. 6 is a diagram showing an example of an image displayed on a lower LCD 12 when a parallax of the user interface is adjusted.

Next, adjustment of the parallax of the user interfaces 60 through 63 (referred to as UI parallax) will be described. The UI parallax is a parallax with respect to only the user interfaces among the images displayed on the upper LCD 22. That is, the UI parallax is a difference (difference in position, shape, or the like) between an image of the user interfaces included in the right-eye image and an image of the user interfaces included in the left-eye image which are displayed on the upper LCD 22. In the present embodiment, the user adjusts the UI parallax of the user interfaces 60 through 63 and thus can adjust a display position (display position in a depth direction sensed by the user; depth perception) of the user interfaces 60 through 63 in a direction perpendicular to the screen. FIG. 6 is a diagram showing an example of an image displayed on the lower LCD 12 when the parallax of the user interfaces is adjusted.

As shown in FIG. 6, when the user performs a predetermined operation (for example, presses a predetermined button), a UI adjustment bar, which is used for adjusting the display position, sensed by the user, of the user interfaces (UI) 60 through 63, is displayed on the lower LCD 12. The UI adjustment slider 64 indicates the display position (display position sensed by the user) of the user interfaces 60 through 63 in the direction perpendicular to the screen of the upper LCD 22. A position of the UI adjustment slider 64 is adjustable in the horizontal direction (or, may be in the vertical direction) by a touch operation performed by the user.

Figure 7:
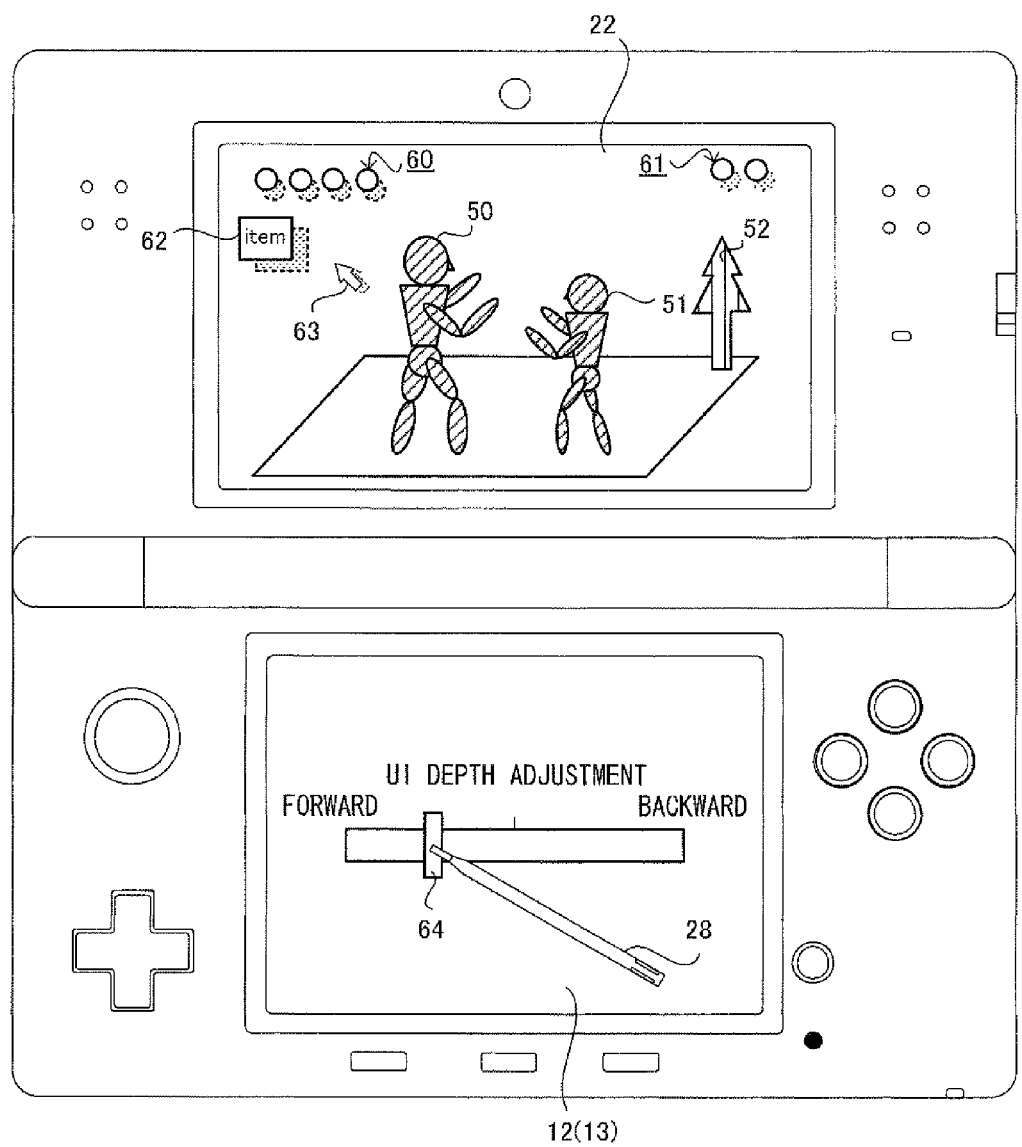
FIG. 7 is a diagram showing an example of respective images displayed on the upper LCD 22 and the lower LCD 12 after a position of a UI adjustment slider 64 is adjusted by the user.

FIG. 7 is a diagram showing an example of respective images displayed on the upper LCD 22 and the lower LCD 12 after the position of the UI adjustment slider 64 is adjusted by the user. As shown in FIG. 7, when the user slides the touch pen 28 in the left direction while touching the UI adjustment slider 64 by using the touch pen 28, the UI adjustment slider 64 moves in the left direction. The user interfaces 60 through 63, which are displayed on the upper LCD 22, are displayed as if the user interfaces 60 through 63 project in front of the screen then. Although, in FIG. 7, the user interfaces 60 through 63 prior to the adjustment are displayed by dotted lines behind the user interfaces 60 through 63 after being adjusted by the UI adjustment slider 64, the user interfaces 60 through 63 prior to the adjustment that are displayed by the dotted lines are actually not displayed. Also, when the user moves the UI adjustment slider 64 in the right direction (to the right side of the center of the UI adjustment bar), the user interfaces 60 through 63 are displayed in the depth direction of the screen.

Figure 8A:
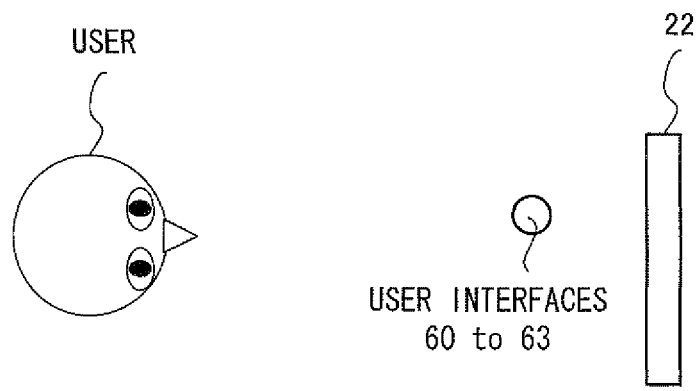
FIG. 8A is a diagram showing the positional relationship between the user, the upper LCD 22, and a display position, recognized by the user, of user interfaces 60 through 63 in the case where the UI adjustment slider 64 is moved in the left direction.
Figure 8B:
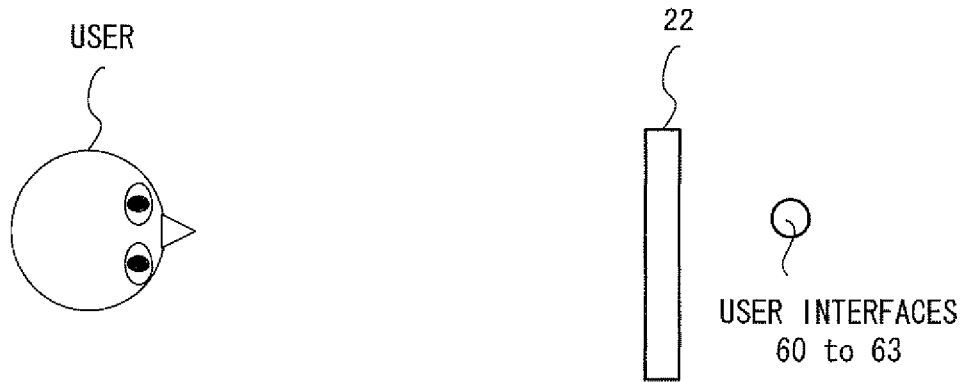
FIG. 8B is a diagram showing the positional relationship between the user, the upper LCD 22, and a display position, recognized by the user, of the user interfaces 60 through 63 in the case where the UI adjustment slider 64 is moved in the right direction.

FIG. 8A is a diagram showing the positional relationship between the user, the upper LCD 22, and a display position, recognized by the user, of the user interfaces 60 through 63 in the case where the UI adjustment slider 64 is moved in the left direction. FIG. 8B is a diagram showing the positional relationship between the user, the upper LCD 22, and display position, recognized by the user, of the user interfaces 60 through 63 in the case where the UI adjustment slider 64 is moved in the right direction. As shown in FIG. 8A, in the case where the UI adjustment slider 64 is moved to the left side of the center of the UI adjustment bar, the display position, recognized by the user, of the user interfaces 60 through 63 is to the front side of the screen. In addition, as shown in FIG. 8B, in the case where the UI adjustment slider 64 is moved in the right direction from the center of the UI adjustment bar, the display position, recognized by the user, of the user interfaces 60 through 63 is farther backward as compared to the screen. In the case where the position of the UI adjustment slider 64 is not adjusted (that is, the UI adjustment slider 64 is positioned at the center as shown in FIG. 6), the display position, recognized by the user, of the user interfaces 60 through 63 is on the screen.

Specifically, the position of the UI adjustment slider 64 is adjusted, and thereby the parallax with respect to the user interfaces 60 through 63 included in the left-eye image and the right-eye image changes. FIG. 9A is a diagram showing the left-eye image and the right-eye image in the case where the UI adjustment slider 64 is moved in the left direction. FIG. 9B is a diagram showing the left-eye image and the right-eye image in the case where the UI adjustment slider 64 is moved in the right direction. In FIG. 9A and FIG. 9B, only the user interfaces 60 through 63 are displayed, and the virtual objects (50 through 53) placed in the virtual space are omitted.

As shown in FIG. 9A, an image 60a of the user interface 60, an image 61a of the user interface 61, an image 62a of the user interface 62, and an image 63a of the cursor 63 are included in a left-eye image A. An image 60b of the user interface 60, an image 61b of the user interface 61, an image 62b of the user interface 62, and an image 63b of the cursor 63 are included in a right-eye image B. The left-eye image A and the right-eye image B have parallax therebetween. Specifically, in the case where the left-eye image A and the right-eye image B are displayed on the upper LCD 22, the image 60a in the left-eye image A is displayed to the right side of the image 60b in the right-eye image B. This makes the user feel as if the user interface 60 is projecting to the front side of the screen of the upper LCD 22 when the left-eye image A and the right-eye image B are displayed on the upper LCD 22. The user interfaces 61 and 62, and the cursor 63 are displayed in the same manner.

Furthermore, when the UI adjustment slider 64 is moved in the right direction, the parallax between the left-eye image A and the right-eye image B changes as shown in FIG. 9B. Specifically, in the case where the left-eye image A and the right-eye image B are displayed on the upper LCD 22, the image 60a in the left-eye image A is displayed to the left side of the image 60b in the right-eye image B. This makes the user feel as if the user interface 60 is present in the depth direction of the screen of the upper LCD 22 in the case where the left-eye image A and the right-eye image B are displayed on the upper LCD 22. The user interfaces 61 and 62, and the cursor 63 are displayed in the same manner.

The parallax of the cursor 63 may not be changed in accordance with the adjustment of the UI adjustment slider 64. In this case, the display position, recognized by the user, of the cursor 63 in the direction perpendicular to the screen does not change in accordance with the position of the UI adjustment slider 64, and is always on the screen.

On the other hand, the virtual objects 50 through 53 placed in the virtual space are actually displayed on the upper LCD 22. The parallax of the virtual objects 50 through 53, however, does not change in accordance with the adjustment of the UI adjustment slider 64. That is, the adjustment of the UI adjustment slider 64 changes only the parallax of the user interfaces 60 through 63. The parallax of the virtual objects 50 through 53 placed in the virtual space is adjusted by the slider 25a of the 3D adjustment switch 25. Hereinafter, the parallax adjustment by the slider 25a of the 3D adjustment switch 25 will be described.

Figure 10A:
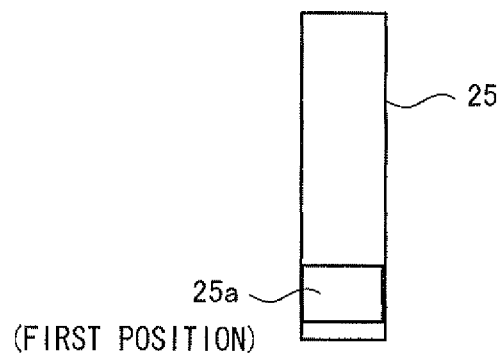
FIG. 10A is a diagram showing a state in which a slider 25*a* of a 3D adjustment switch 25 is set at a first position.
Figure 10B:
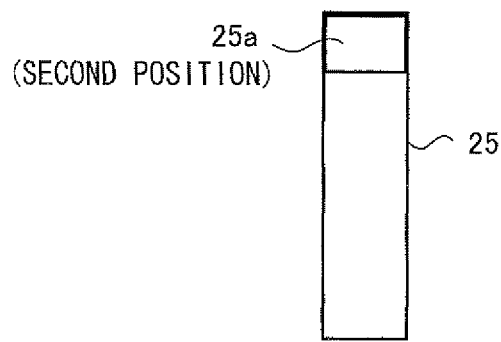
FIG. 10B is a diagram showing a state in which the slider 25*a* of the 3D adjustment switch 25 is set at a second position.

FIG. 10A is a diagram showing a state in which the slider 25a of the 3D adjustment switch 25 is set at a first position, and FIG. 10B is a diagram showing a state in which the slider 25a of the 3D adjustment switch 25 is set at a second position. As shown in FIG. 10A, when the slider 25a is set at a position slightly above the lowest point, stereoscopic presentation of the upper LCD 22 turns ON and the parallax in this case is set to be a minimum. Further, as shown in FIG. 10B, when the slider 25a is set at a position at the highest point, the parallax is set to be a maximum. When the slider 25a is set at the lowest point, the stereoscopic presentation of the upper LCD 22 is turned OFF and, in this case, the parallax barrier in the upper LCD 22 turns OFF. Therefore, the upper LCD 22 displays the image in a planer manner.

Figure 11A:
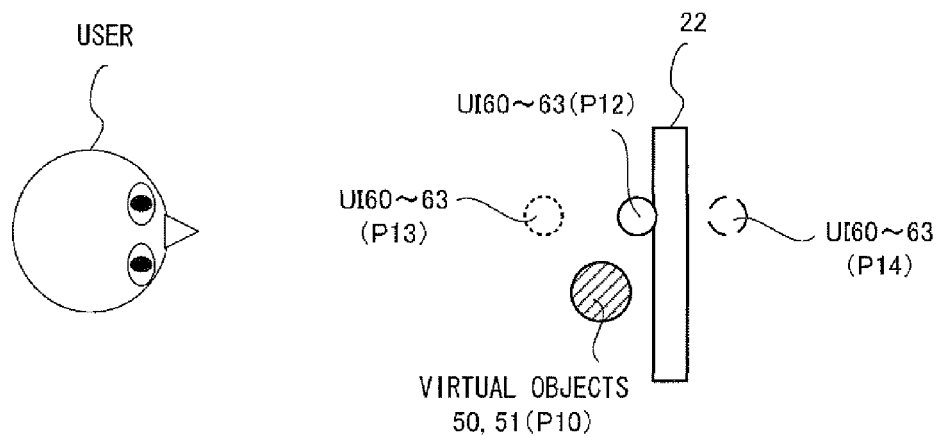
FIG. 11A is a diagram showing the positional relationship, recognized by the user, between the user, virtual objects 50 through 51, and the user interfaces 60 through 63 in the case where the slider 25*a* of the 3D adjustment switch 25 is set at the first position.
Figure 11B:
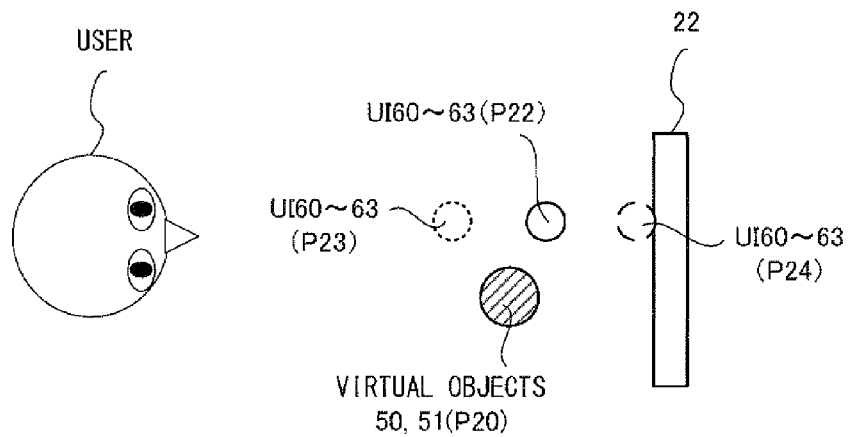
FIG. 11B is a diagram showing the positional relationship, recognized by the user, between the user, the virtual objects 50 through 51, and the user interfaces 60 through 63 in the case where the slider 25*a* of the 3D adjustment switch 25 is set at the second position.

FIG. 11A is a diagram showing the positional relationship, recognized by the user, between the user, the virtual objects 50 through 51, and the user interfaces 60 through 63 in the case where the slider 25a of the 3D adjustment switch 25 is set at the first position. FIG. 11B is a diagram showing the positional relationship, recognized by the user, between the user, the virtual objects 50 through 51, and the user interfaces 60 through 63 in the case where the slider 25a of the 3D adjustment switch 25 is set at the second position.

As shown in FIG. 11A, when the slider 25a of the 3D adjustment switch 25 is set at the first position, the parallax between the right-eye image and the left-eye image is set to be a minimum. In this case, the user feels as if the virtual objects 50 through 51 (the player character 50 and the enemy character 51) are present at a position P10 which is slightly in front of the screen of the upper LCD 22. Further, in the case where the adjustment of the user interfaces 60 through 63 by the UI adjustment slider 64 is not conducted, the user feels as if the user interfaces 60 through 63 are present at a position P12 on the screen of the upper LCD 22 (a solid line circle). Although the tree object 52 is omitted in FIG. 11A, it appears to the user as if the tree object 52 is positioned, for example, slightly in the depth direction of the screen.

Furthermore, if the user adjusts the position of the UI adjustment slider 64 in the case where the slider 25a of the 3D adjustment switch 25 is set at the first position, the display position of the user interfaces 60 through 63 is adjusted. For example, when the UI adjustment slider 64 is set to be on the left end, the user interfaces 60 through 63 are displayed at a position P13 which is in front of the screen (a dotted line circle on the left in FIG. 11A). Moreover, when the UI adjustment slider 64 is set to be on the right end, the user interfaces 60 through 63 are displayed at a position P14 which is in the depth direction of the screen (a dashed line circle on the left in FIG. 11A).

On the other hand, as shown in FIG. 11B, when the slider 25a of the 3D adjustment switch 25 is set at the second position, the parallax between the right-eye image and the left-eye image is set to be a maximum. In this case, the user feels as if the virtual objects 50 through 51 are present at a position P20 which is frontward as compared to the case shown in FIG. 11A. Moreover, in the case where the adjustment by the UI adjustment slider 64 is not conducted, the user feels as if the user interfaces 60 through 63 are present at a position P22 which is frontward as compared to the case shown in FIG. 11A (a solid line circle). In the case where the slider 25a of the 3D adjustment switch 25 is set at the second position, the position of the tree object 52 also changes from the position thereof in the case where the slider 25a is set at the first position.

Furthermore, if the user adjusts the position of the UI adjustment slider 64 in the case where the slider 25a of the 3D adjustment switch 25 is set at the second position, the display position of the user interfaces 60 through 63 is adjusted. For example, when the UI adjustment slider 64 is set to be on the left end, the user interfaces 60 through 63 are displayed at a position P23 which is frontward as compared to the display position P13 at which the user interfaces 60 through 63 are displayed in the case where the UI adjustment slider 64 shown in FIG. 11A is set to be on the left end (a dotted line circle on the left in FIG. 11B). Also, when the UI adjustment slider 64 is set to be on the right end as shown in FIG. 11B, the user interfaces 60 through 63 are displayed at a position P24 on the screen.

As described above, the parallax of the entirety of the virtual space is adjusted by the 3D adjustment switch 25, and thus the appearance (the depth perception) of the virtual objects placed in the virtual space changes. For example, it appears as if the virtual objects are projecting from the screen or are in the depth direction farther than the screen is. A reference value (the UI parallax prior to the adjustment thereof by the UI adjustment slider 64; initial value) of the parallax of the user interfaces 60 through 63 is also changed by the 3D adjustment switch 25. That is, the reference value of the parallax of the user interfaces 60 through 63 is set by the 3D adjustment switch 25, the relative change from the reference value is set in accordance with the position of the UI adjustment slider 64, and thereby the UI parallax is set. As described above, the 3D adjustment switch 25 allows the adjustment of the parallax of the entirety of the image, which is displayed on the upper LCD 22 and includes the virtual objects 50 through 53 placed in the virtual space and the user interfaces 60 through 63.

As described above, the parallax of the virtual space and the parallax of the user interface are adjusted by the 3D adjustment switch 25. That is, the position of the slider 25a of the 3D adjustment switch 25 is adjusted, and thereby the parallax of the virtual objects 50 through 53 and the parallax of the user interfaces 60 through 63 are adjusted. As a result, the display position (display position, sensed by the user, in the direction perpendicular to the screen) of the virtual objects 50 through 53 and the display position of the user interfaces 60 through 63 change. Moreover, the position of the slider 25a is adjusted, and thereby a range of adjustment of the UI parallax by the UI adjustment slider 64 is set. That is, in the case where the slider 25a of the 3D adjustment switch 25 is set at the first position, the range of adjustment (a range of display position in the direction perpendicular to the screen) of the user interfaces 60 through 63 by the UI adjustment slider 64 is set to be in a range from P13 through to P14 as shown in FIG. 11A. Also, in the case where the slider 25a of the 3D adjustment switch 25 is set at the second position, the range of adjustment of the user interfaces 60 through 63 by the UI adjustment slider 64 is set be in a range from P23 through to P24 as shown in FIG. 11B.

Moreover, in the case where the slider 25a of the 3D adjustment switch 25 is set at a position between the first position and the second position, the user feels as if, for example, the virtual objects 50 and 51 are displayed near the user's side as compared to the position P10 shown in FIG. 11A is and near the upper LCD 22 side as compared to the position P20 shown in FIG. 11B is. In this case, the range of adjustment of the user interfaces 60 through 63 is also determined in accordance with the position of the slider 25a. Specifically, the user feels as if the user interfaces 60 through 63 are displayed at a position between the position P13 shown in FIG. 11A and the position P23 shown in FIG. 11B in the case where the UI adjustment slider 64 is set to be on the left end. Alternatively, the user feels as if the user interfaces 60 through 63 are displayed at a position between the position P14 shown in FIG. 11A and the position P24 shown in FIG. 11B in the case where the UI adjustment slider 64 is set to be on the right end.

As described above, the parallax of the virtual objects 50 through 53 placed in the virtual space is adjusted by the 3D adjustment switch 25 and thereby the display position of the virtual objects 50 through 53 in the direction perpendicular to the screen is adjusted. In addition, the range of adjustment of the user interfaces 60 through 63 by the UI adjustment slider 64 is also set, as well as the parallax of the user interfaces 60 through 63 is adjusted by the 3D adjustment switch 25. The parallax of the user interfaces 60 through 63 is then adjusted by using the UI adjustment slider 64 within the range of adjustment set by the 3D adjustment switch 25. Therefore, the parallax adjustment of the user interfaces 60 through 63 can be conducted separately from the parallax adjustment of the virtual objects 50 through 53.

The parallax of only the virtual objects 50 through 53 placed in the virtual space may be adjusted by the 3D adjustment switch 25. That is, the parallax adjustment of the user interfaces 60 through 63 may be conducted based on the position of the UI adjustment slider 64, independently of the position of the slider 25a of the 3D adjustment switch 25. In this case, the parallax adjustment of the virtual objects 50 through 53 by using the 3D adjustment switch 25 and the parallax adjustment of the user interfaces 60 through 63 by using the UI adjustment slider 64 can be conducted independently of each other.

(Detail of Display Process)

Figure 12:
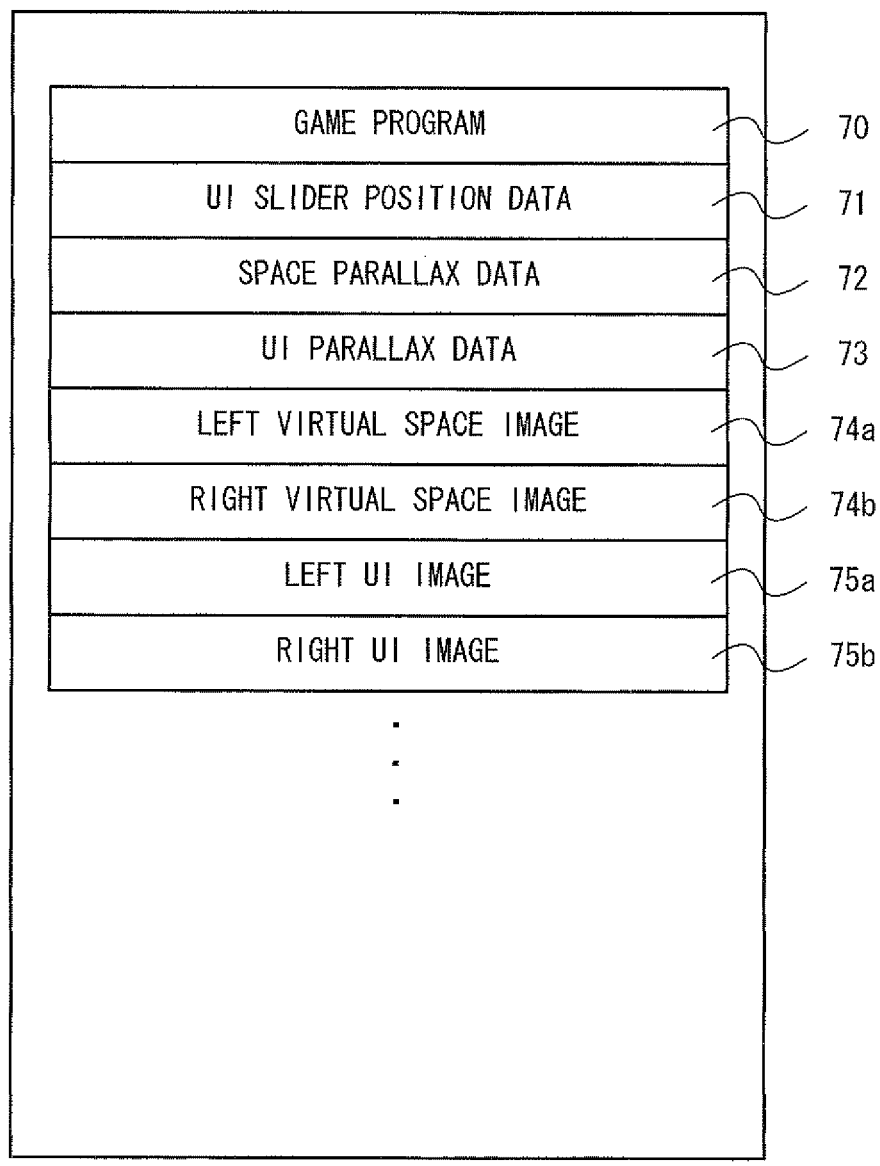
FIG. 12 is a diagram illustrating a memory map of a RAM (such as a main memory 32) of the game apparatus 10.

Next, a display process according to the present embodiment will be described in detail with reference to FIG. 12 and FIG. 13. Initially, main data which are stored in the display process in the main memory 32 and the VRAM 313 (hereinafter, these components may be collectively called RAM) will be described. FIG. 12 is a diagram illustrating a memory map of the RAM (such as the main memory 32) of the game apparatus 10. As shown in FIG. 12, a game program 70, UI slider position data 71, space parallax data 72, UI parallax data 73, a left virtual space image 74a, a right virtual space image 74b, a left UI image 75a, a right UI image 75b, and the like are stored in the RAM. Other data stored in the RAM are information regarding the player character 50 (information such as position, orientation, and the life power), image data of the player character 50, information and image data of the enemy character 51, images regarding the UI adjustment slider 64, image data of the user interfaces 60 through 63, data regarding the button operations performed by the user, and the like.

The game program 70 is a program for causing the information processing section 31 (CPU 311) to execute the display process shown in a flowchart described below.

The UI slider position data 71 is data regarding the position of the UI adjustment slider 64.

The space parallax data 72 is data dependent on the position of the slider 25a of the 3D adjustment switch 25 and regarding the parallax adjustment of the virtual space. Specifically, the space parallax data 72 is data which indicates a distance Lv (see FIG. 14) between the cameras at the left and at the right, which are the components of the virtual stereo camera 55 arranged in the virtual space. The virtual stereo camera 55 is used for taking images of the virtual objects 50 through 53 placed in the virtual space.

The UI parallax data 73 is data dependent on the position of the UI adjustment slider 64 and regarding the parallax adjustment of the user interface. Specifically, the UI parallax data 73 is data which indicates a distance Lu (see FIG. 15) between the cameras at the left and at the right which are the components of the UI virtual stereo camera 65 that is used for taking images of the user interfaces 60 through 63.

The left virtual space image 74a is an image obtained by the left virtual camera 55a of the virtual stereo camera 55 taking an image of the virtual space.

The right virtual space image 74b is an image obtained by the right virtual camera 55b of the virtual stereo camera 55 taking an image of the virtual space.

The left UI image 75a is an image obtained by the left UI virtual camera 65a of the UI virtual stereo camera 65 taking an image of the user interfaces 60 through 63.

The right UI image 75b is an image obtained by the right UI virtual camera 65b of the UI virtual stereo camera 65 taking an image of the user interfaces 60 through 63.

Next, the display process will be described in detail with reference to FIG. 13. FIG. 13 is a main flowchart showing in detail the display process according to the present embodiment. When the game apparatus 10 is powered on, the information processing section 31 (CPU 311) of the game apparatus 10 executes a boot program stored in the ROM to initialize each unit, such as the main memory 32. Next, the game program 70 stored in a non-volatile memory (such as the external memory 44; the computer-readable storage medium) is read into the RAM (specifically, the main memory 32), and the CPU 311 of the information processing section 31 starts executing the program. The process shown in the flowchart of FIG. 13 is performed by the information processing section 31 (CPU 311 or GPU 312) after the above process has completed.

Figure 13:
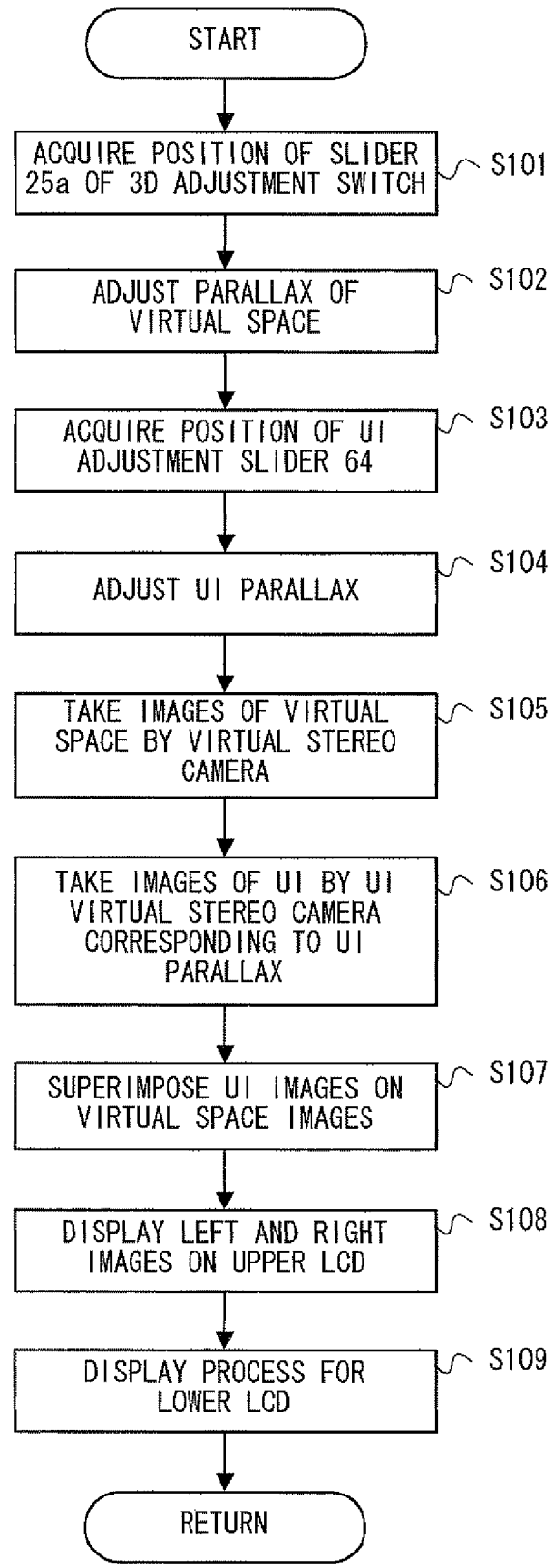
FIG. 13 is a main flowchart showing in detail a display process according to the present embodiment.

The description of processes, which does not directly relate to the present invention, is omitted in FIG. 13. A processing loop of step S101 through step S109 shown in FIG. 13 is repeatedly executed for each frame (for example, ⅓₀ second or ⅙₀ second, which is referred to as frame time).

Initially, in step S101, the information processing section 31 acquires the position of the slider 25a of the 3D adjustment switch 25. Next, the information processing section 31 executes a process of step S102.

In step S102, the information processing section 31 adjusts the parallax of the virtual space. Specifically, the information processing section 31 sets, in accordance with the position of the slider 25a acquired in step S101, the distance Lv between the cameras at the left and at the right, which are the components of the virtual stereo camera 55 arranged in the virtual space.

Figure 14:
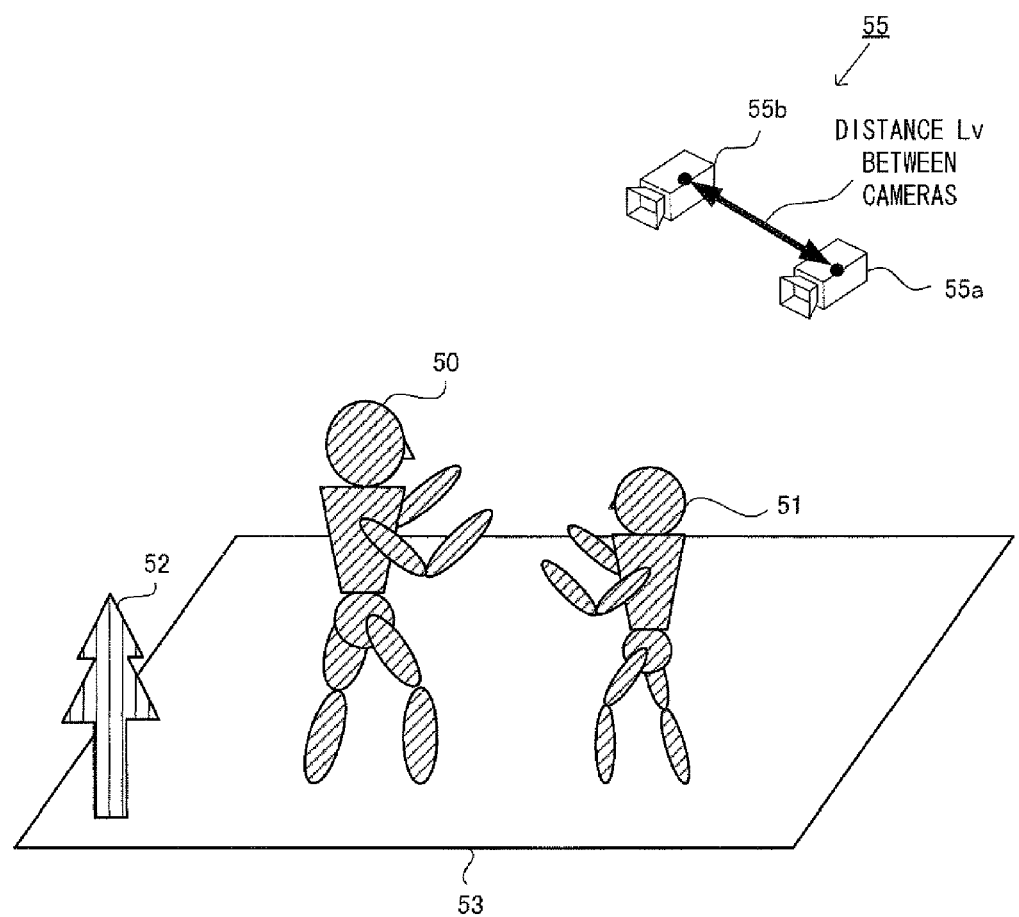
FIG. 14 is a diagram showing a distance Lv between cameras at the left and at the right which are components of a virtual stereo camera 55.

FIG. 14 is a diagram showing the distance Lv between the cameras at the left and at the right which are the components of the virtual stereo camera 55. As shown in FIG. 14, the virtual stereo camera 55 includes the left virtual camera 55a and the right virtual camera 55b. The left virtual camera 55a and the right virtual camera 55b are arranged in the virtual space, in accordance with the game status. The virtual stereo camera 55 takes images of the virtual objects 50 through 53 placed in the virtual space. In step S102, the distance Lv between the left virtual camera 55a and the right virtual camera 55b is set in accordance with the position of the slider 25a. After step S102, a process of step S103 is executed.

In step S103, the information processing section 31 acquires the position of the UI adjustment slider 64. Specifically, the information processing section 31 refers to the UT slider position data 71 and obtains the position of the UI adjustment slider 64. Although omitted in the flowchart shown in FIG. 13, in the case where an image used for adjusting the UI parallax is displayed on the lower LCD 12 as shown in FIG. 6, the information processing section 31 determines whether the UI adjustment slider 64 has been touched, based on the touch position detected by the touch panel 13. If it is determined that the UI adjustment slider 64 has been touched, the position of the UT adjustment slider 64 is updated based on the touch position, and stored in the RAM as the UI slider position data 71. Next, the information processing section 31 executes a process of step S104.

In step S104, the information processing section 31 adjusts the UI parallax. Specifically, the information processing section 31 adjusts the UI parallax, based on the distance Lv between the cameras, which is set in step S102, and the position of the UI adjustment slider 64 acquired in step S103. The UI parallax is a parallax with respect to the user interfaces 60 through 63. More specifically, images of the user interfaces 60 through 63 are taken by the UI virtual stereo camera 65, as shown in FIG. 15. FIG. 15 is a diagram showing how the images of the user interfaces 60 through 63 are taken by the UI virtual stereo camera 65. The UI parallax indicates the distance Lu between the left UI virtual camera 65a and the right UI virtual camera 65b which are the components of the UI virtual stereo camera 65. That is, in step S104, the information processing section 31 calculates the distance Lu between the cameras at the left and at the right, which are the components of the UI virtual stereo camera 65, based on the parallax of the virtual space and the position of the UI adjustment slider 64, and stores the obtained data in the RAM as the UI parallax data 73. The UI parallax calculated here is set within the range based on the parallax of the virtual space adjusted in step S102, as described above with reference to FIG. 11A and FIG. 11B. That is, the reference value and the range (maximal and minimal values) of the UI parallax are determined based on the distance Lv between the cameras at the left and at the right, which are the components of the virtual stereo camera 55, and the UI parallax is determined based on the position of the UI adjustment slider 64 within the determined range. Specifically, the reference value is determined based on the distance Lv between the cameras, and an amount of change from the reference value is determined in accordance with the position of the UI adjustment slider 64, thereby determining the distance Lu (the UI parallax) between the cameras. Next, the information processing section 31 executes a process of step S105.

In step S105, the information processing section 31 takes images of the virtual space by the virtual stereo camera 55. Specifically, the information processing section 31 generates the left virtual space image 74a by taking an image of the virtual space by using the left virtual camera 55a of the virtual stereo camera 55, and generates the right virtual space image 74b by taking an image of the virtual space by using the right virtual camera 55b of the virtual stereo camera 55. This generates a left image and a right image taken of the virtual objects 50 through 53. The left and right images are images having parallax therebetween in accordance with the distance Lv between the cameras which is set in step S102. The information processing section 31 then stores the generated two images in the RAM. Next, the information processing section 31 executes a process of step S106.

In step S106, the information processing section 31 takes images of the user interfaces 60 through 63 by the UI virtual stereo camera 65. Specifically, the information processing section 31 generates the left UI image 75a by taking an image of the user interfaces 60 through 63 by using the left UI virtual camera 65a of the UT virtual stereo camera 65. In addition, the information processing section 31 generates the right UI image 75b by taking an image of the user interfaces 60 through 63 by using the right UI virtual camera 65b of the UI virtual stereo camera 65. The user interfaces 60 through 63 are stored in the RAM as two-dimensional or three-dimensional models. In the process of step S106, the user interfaces 60 through 63 are placed in a virtual space different from the virtual space in which the virtual objects 50 through 53 are placed, and the images of the user interfaces 60 through 63 are taken by the UT virtual stereo camera 65. This generates the left image and the right image (the left UI image 75a and the right UI image 75b) taken of only the user interfaces 60 through 63. The information processing section 31 stores the generated left and right images in the RAM. Next, the information processing section 31 executes a process of step S107.

In step S107, the information processing section 31 superimposes the UI image generated in step S106 on the virtual space image generated in step S105. Specifically, the information processing section 31 overwrites the left virtual space image 74a with the left UI image 75a without comparing a Z value (depth value). The Z value is a value which indicates a position in an imaging direction of the virtual camera, and is stored for each pixel in the RAM when an image is taken. Usually, it is determined which pixel of two images is displayed by comparing the Z value for each pixel of the two images. Here, however, the left virtual space image 74a is overwritten with the left UI image 75a without comparing the Z value. That is, the information processing section 31 overwrites the left virtual space image 74a with the left UI image 75a so that the user interfaces 60 through 63 included in the left UI image 75a are always displayed. Also, similarly, the information processing section 31 overwrites the right virtual space image 74b with the right UI image 75b without comparing the Z value. This causes the virtual objects 50 through 53 and the user interfaces 60 through 63 to be included in the left virtual space image 74a and the right virtual space image 74b. Next, the information processing section 31 executes a process of step S108.

In step S108, the information processing section 31 displays on the upper LCD 22 the left virtual space image 74a and the right virtual space image 74b which are overwritten in step S107. This allows the overwritten left virtual space image 74a to be viewed with the user's left eye, and the overwritten right virtual space image 74b to be viewed with the user's right eye. Next, the information processing section 31 executes a process of step S109.

In step S109, the information processing section 31 executes a display process for the lower LCD 12. For example, the information processing section 31 generates an image, which is used for adjusting the UI parallax, as shown in FIG. 7, in accordance with the UI slider position data 71 updated by the touch operation, and displays the image on the lower LCD 12. This is the end of the process shown in the flowchart in FIG. 13.

As described above, in the present embodiment, the adjustment of the parallax of the user interfaces 60 through 63 is conducted separately from the adjustment of the parallax of the virtual spaces. This allows the user to adjust the position (the position in the direction perpendicular to the screen) of the user interfaces when the user sees the user interfaces so that the user can best see the user interfaces.

While, in the present embodiment, the parallax of all the user interfaces 60 through 63 is adjusted by using the UI adjustment slider 64, only some of the plurality of user interfaces may be adjusted in another embodiment. For example, the parallax of only the user interfaces 60 through 62 may be adjusted and the parallax of the cursor 63 may be constant without being adjusted. Moreover, the user interface, in which the parallax thereof is adjusted, may be selectable by the user. In this case, the parallax of the user interface only selected by the user is adjusted. In addition, as an example of such user interface is not limited to the above-described user interfaces. Any user interface is acceptable if the user interface is different from the virtual objects placed in the virtual space, and is displayed for displaying any information for the user or for accepting an input from the user.

That is, the "user interface" described herein is not operation means (such as the operation button 14 and the analog stick 15), which is physically operated by the user, or the virtual object (such as the virtual objects 50 through 53) in the virtual space displayed on the screen, but what is displayed on the screen for notifying the user of predetermined information. For example, the "user interface" is what is displayed on the screen for notifying the user of the attribute of the virtual object present in the virtual space or parameters (such as the life power of the virtual object) relating to the virtual object. The "user interface" is also a designating object (the cursor 63) which indicates a position designated by the user on the screen, or a predetermined icon (such as the user interface 62 used for item selection) or the like which is displayed on the screen and designated by the user.

In the present embodiment, the left and right images which are viewed by the user are generated by superimposing the UI images taken, by the UI virtual stereo camera 65, of the user interfaces 60 through 63 on the virtual space images taken, by the virtual stereo camera 55, of the virtual space. That is, the images of the virtual objects 50 through 53 placed in the virtual space and the images of the user interfaces 60 through 63 are taken by different cameras. This generates the stereoscopic image including the user interfaces and the virtual space. In another embodiment, the user interfaces 60 through 63 may be placed in the virtual space in which the virtual objects 50 through 53 are placed and images of the virtual space may be taken by the virtual stereo camera 55.

In this case, the position of the user interfaces 60 through 63 in the virtual space is determined in accordance with the position of the UI adjustment slider 64. Specifically, the user interfaces 60 through 63 are placed, relative to the imaging directions of the virtual stereo camera 55, at a position in accordance with the position of the UI adjustment slider 64. For example, in the case where the UI adjustment slider 64 is set to be on the left end, the user interfaces 60 through 63 are placed in the imaging directions of the virtual stereo camera 55 at a position close to the virtual stereo camera 55. Moreover, for example, in the case where the UI adjustment slider 64 is set to be on the right end, the user interfaces 60 through 63 are placed in the imaging directions of the virtual stereo camera 55 at positions distanced from the virtual stereo camera 55.

Further, the user interface is preferentially displayed in the case where the user interface is placed in the virtual space. That is, the left and right images are generated as if the user interface is present frontward as compared to where the virtual objects are even when the user interface is present at a position in the depth direction (on the opposite side of the virtual stereo camera) farther than the virtual object is. For example, in the case where the images of the virtual object and the user interface are taken by the virtual stereo camera, the user interface is always rendered without comparing the Z value of the virtual object with the Z value of the user interface. Also, the respective positions of the virtual object and the user interface in the depth direction when seen from the virtual stereo camera are compared with each other and if the user interface is positioned backward as compared to where the virtual object is, the images may be generated as if the user interface is positioned frontward than the virtual object is. In this case, comparison may be conducted with respect to positions, in the depth direction, of only respective overlapping portions of the virtual object and the user interface when seen from the virtual stereo camera. The images may be then generated as if the portion, of the user interface, which overlaps with the virtual object, is positioned frontward as compared to where the virtual object is.

Further, in another embodiment, an indication (such as information which indicates at which position in the direction perpendicular to the screen the user interface is displayed), which is a reference display for the parallax adjustment, may be displayed when the parallax with respect to the user interface (the UI parallax) is adjusted.

Figure 16:
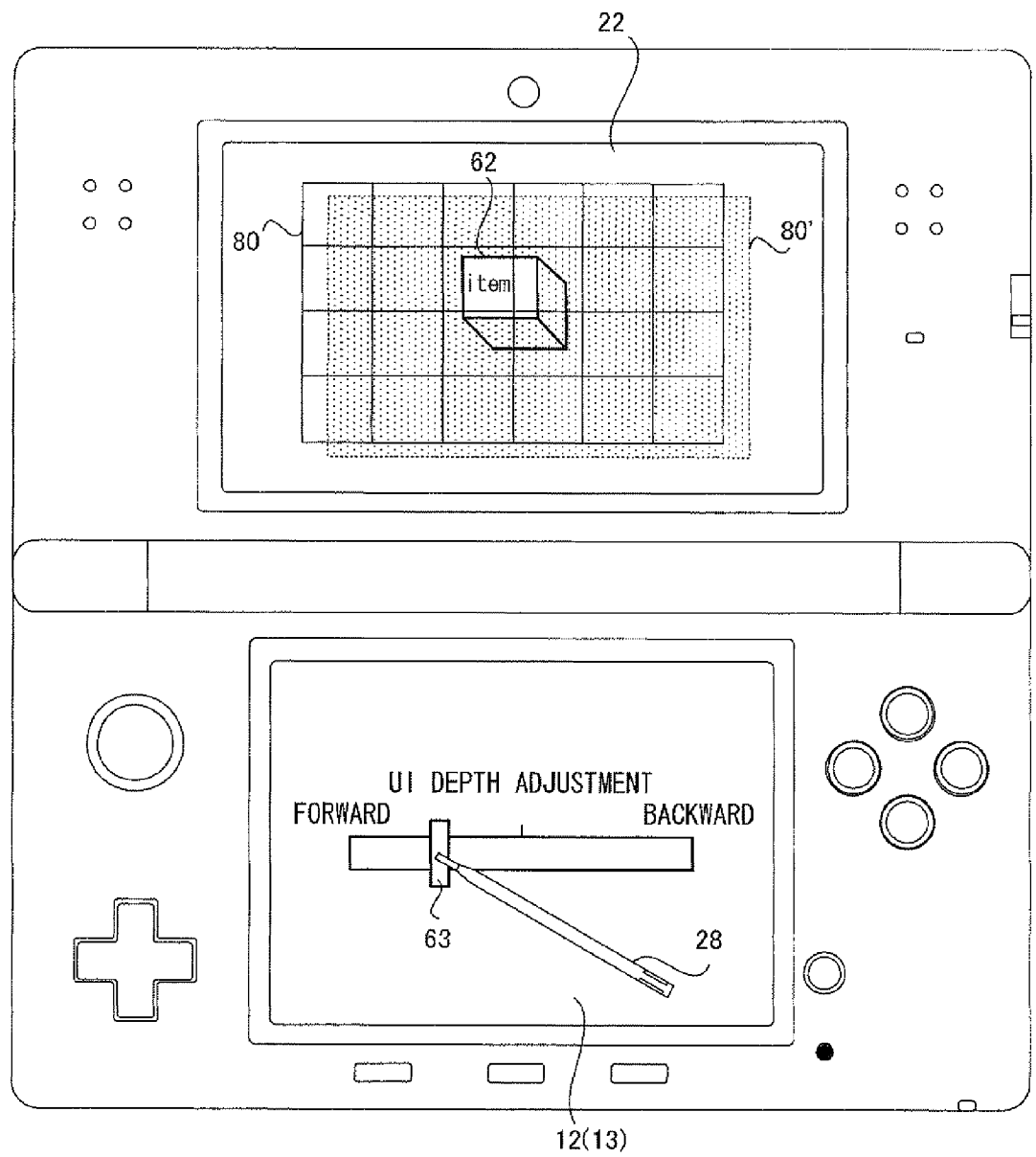
FIG. 16 is a diagram showing an example of respective screens when the UT adjustment slider 64 is adjusted in another embodiment.

For example, when the UI adjustment slider 64 is adjusted, a plane indicating the display position of the user interface may be displayed together with the user interface. FIG. 16 is a diagram showing an example of the screen when the UI adjustment slider 64 is adjusted in another embodiment. In FIG. 16, for the purpose of illustration, only the user interface 62 is displayed and other user interfaces and virtual objects are omitted. As shown in FIG. 16, an auxiliary plane 80 is displayed on the upper LCD 22 when the UI adjustment slider 64 is adjusted. 80' indicates the auxiliary plane 80 prior to the adjustment of the position of the UI adjustment slider 64. The display position of the auxiliary plane 80 in the direction perpendicular to the screen, i.e., the depth perception of the auxiliary plane 80, changes by the change in position of the UI adjustment slider 64. Specifically, the display position of the auxiliary plane 80 changes in accordance with the position of the user interface 62 in the direction perpendicular to the screen. That is, the auxiliary plane 80 is the display position of the user interface and indicates the display position, sensed by the user, in the direction perpendicular to the screen. Specifically, the information processing section 31 places the auxiliary plane 80 at the same position as the user interfaces 60 through 63 are and perpendicular to the imaging directions of the UI virtual stereo camera 65. The information processing section 31 then takes images of the auxiliary plane 80 by the UT virtual stereo camera 65 together with the user interface 60 through 63. This allows the obtainment of the images of the auxiliary plane 80 having the same parallax therebetween as the user interface 60 through 63, and the image as shown in FIG. 16 is displayed on the upper LCD 22. As described above, displaying the auxiliary plane 80 during the parallax adjustment of the user interface allows the user to easily conduct the parallax adjustment of the user interface.

Figure 17:
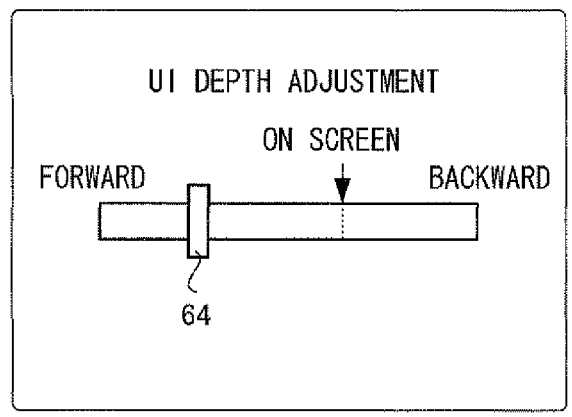
FIG. 17 is a diagram showing an example of information, which is displayed on the lower a time LCD 12 and is a reference used in adjusting a UT parallax.

Further, for example, in the case where the UI parallax is adjusted by using the UI adjustment slider 64, information, which is the reference used in adjusting the UI parallax, may be displayed on the lower LCD 12. FIG. 17 is a diagram showing an example of such information, which is the reference used in adjusting the UI parallax displayed on the lower LCD 12. For example, in the case where the user interface is displayed on the upper LCD 22 as shown in FIG. 17, a reference (such as text or an image), which indicates that the user interface is displayed on the screen of the upper LCD 22, may be displayed on the adjustment bar.

Further, in the present embodiment, the parallax of the virtual objects 50 through 53 and the parallax of the user interfaces 60 through 63 are adjusted by the adjustment of the 3D adjustment switch 25. In another embodiment, the parallax of only the virtual objects 50 through 53, i.e., the parallax of the virtual space except that of the user interfaces 60 through 63, may be adjusted by the 3D adjustment switch 25. That is, the parallax of the virtual space is the parallax with respect to the virtual objects 50 through 53 placed in the virtual space and therefore, the parallax of the virtual space may be adjusted in accordance with the position of the slider 25a of the 3D adjustment switch 25. Also, the parallax of the virtual space may be adjusted not only by the 3D adjustment switch 25 and may be adjusted by button operations or touch operations. In this case, the parallax (the UI parallax) with respect to the user interfaces 60 through 63 is determined separately from the parallax (the parallax of the virtual space) with respect to the virtual objects 50 through 53 present in the virtual space. Due to this, once the user adjusts the parallax of the user interfaces 60 through 63 by using the UI adjustment slider 64, the parallax of the user interfaces 60 through 63 does not change even if the parallax of the virtual space is adjusted by using the 3D adjustment switch 25. Therefore, the user is able to fix the user interfaces 60 through 63 at a position where the user can best see, and adjust the parallax of the virtual space by using the 3D adjustment switch 25.

Further, in the present embodiment, the parallax is changed by changing the distance between the virtual stereo camera 55 and the UI virtual stereo camera 65 which are the components of the virtual stereo camera. In another embodiment, the parallax may be changed by another method.

Figure 18A:
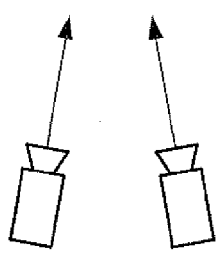
FIG. 18A is a diagram showing an example in which imaging directions of the virtual stereo camera are changed.
Figure 18B:
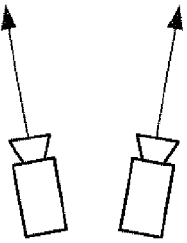
FIG. 18B is a diagram showing an example in which the imaging directions of the virtual stereo camera are changed.

For example, the parallax may be changed by changing the imaging directions of the virtual stereo camera. FIG. 18A and FIG. 18B are diagrams each showing the case where the imaging directions of the virtual stereo camera are changed. Specifically, as shown in FIG. 18A, the parallax may be adjusted by changing the imaging directions of the virtual stereo camera at the left and at the right so as to be directed inward to each other. Alternately, as shown in FIG. 18B, the parallax may be adjusted by changing the imaging directions of the virtual stereo camera at the left and at the right so as to be directed outward of each other. As described above, changing the imaging directions of the virtual stereo camera at the left and at the right changes the position of the object included in the left and right images on the images. This allows the change, which is similar to that in the case where the distance between cameras which are the components of the virtual stereo camera is changed, to occur.

Figure 19:
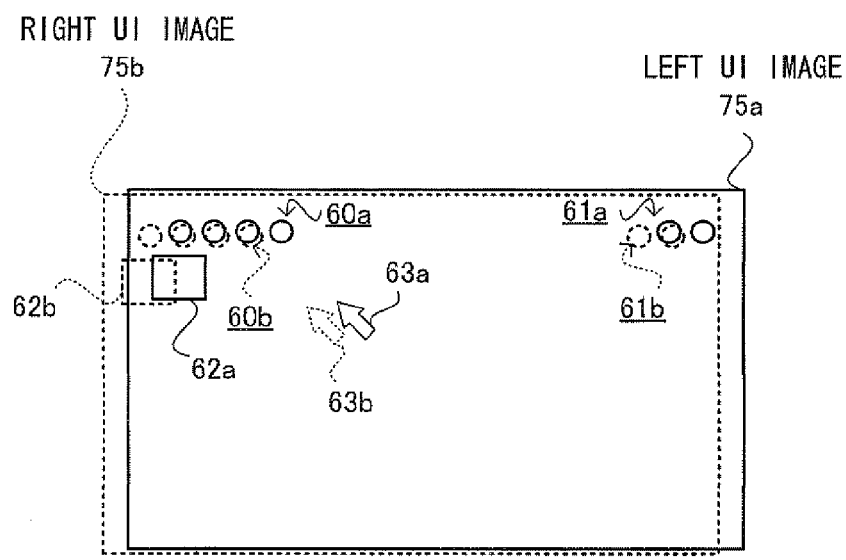
FIG. 19 is a diagram in which a left UI image 75*a* and a right UI image 75*b*, which are taken by the UI virtual stereo camera 65, are shifted in the horizontal direction from each other and superimposed one on the other.

Further, for example, the parallax may be adjusted by shifting in the left-right direction the left-eye image (the left virtual space image 74a or the left UI image 75a) and the right-eye image (the right virtual space image 74b or the right UI image 75b), which are obtained by taking images by the virtual stereo camera (55 or 65), from each other. Specifically, for example, in the case where the parallax of the user interfaces 60 through 63 is adjusted, the user interfaces 60 through 63 can be displayed in the frontward direction as follows. FIG. 19 is a diagram in which the left UI image 75a and the right UI image 75b, which are obtained by taking images by the UI virtual stereo camera 65, are shifted in the horizontal direction from each other and superimposed one on the other. As shown in FIG. 19, the left UT image 75a is displayed on the upper LCD 22, being shifted in the right direction, and the right UI image 75b is displayed on the upper LCD 22, being shifted in the left direction. In this case, only the overlapping portion of the two images is displayed on the upper LCD 22. Although, in FIG. 19, the left and right images are displayed so as to be shifted in the up-down direction from each other, these images are actually not shifted in the up-down direction but are shifted in the left-right direction from each other. For example, the image 60a of the user interface 60 included in the left UT image 75a is displayed on the right side as compared to before the adjustment, and the image 60b of the user interface 60 included in the right UT image 75b is displayed on the left side as compared to before the adjustment. Therefore, the user feels as if the user interface 60 is displayed in the frontward direction of the screen as compared to before the adjustment. Alternatively, the parallax may be adjusted by shifting only the image of the user interface included in the left UI image 75a and the right UI image 75b in the left-right direction without shifting the entirety of the left UI image 75a and the entirety of the right UI image 75b in the left-right direction. The parallax between the images taken of the virtual objects 50 through 53 is adjustable in the same manner. The parallax between the two images may be thus adjusted.

Further, the parallax may not be created by the virtual stereo camera, but by one virtual camera. That is, one virtual camera may be used to take two images as described above and the parallax between the two images may be created by shifting the two images in the left-right direction. Alternatively, the parallax may be created by shifting the position of the object (the virtual object or the user interface) included in the images.

Further, while, in the above embodiment, the parallax of the user interfaces is adjusted by the touch operation on the lower LCD 12 (the touch panel 13), in another embodiment, an input by the user may be made by any means. For example, the parallax of the user interface may be adjusted according to a button operation (an operation on 14A through 14E, 14G, 14H, 15, or the like). Moreover, for example, the parallax of the user interface may be adjusted by the user titling the game apparatus 10 or shaking the game apparatus 10 in a predetermined direction. The tilt of the game apparatus 10 or whether the game apparatus 10 is shaken in the predetermined direction can be detected by using the acceleration sensor 39 or the angular velocity sensor 46. Also, similarly, the adjustment of the parallax of the virtual object (the parallax of the virtual space) may be conducted by, but not limited to, the 3D adjustment switch 25 and may be conducted by a button operation, or the like.

Further, while, in the present embodiment, the game apparatus includes two screens, in another embodiment, solely one screen configured of performing stereoscopic display may be included.

Further, in another embodiment, the method of adjusting the user interface is not limited to the above-described game and is applicable to any other games. In addition, the above method is not limited to games, and is applicable to the cases where an image taken of the virtual space and the user interface, which is different from the image of the virtual space and in which information for the user is displayed, are stereoscopically displayed. The above method is also applicable to the case where user interfaces, such as text and an icon, are superimposed on an image of a real space and a stereoscopic image is displayed. That is, adjustment of the parallax of the text and the like may be conducted separately from the parallax adjustment of the image of the real space. For example, in the case where a stereoscopic image (such as a still image or video) taken, by the outer imaging section 23, of the real space is displayed on the upper LCD 22 together with the icons used for the button operations, the parallax adjustment of the icon may be conducted by the above method, in addition to the parallax adjustment of the displayed stereoscopic image to be conducted. In this case, the parallax adjustment of the stereoscopic image taken of the real space may be conducted by the 3D adjustment switch 25 or another button, or by shifting the taken left image and the taken right image in the horizontal direction. The icon is a type of user interface and may be, for example, an image which is displayed on the lower right of the screen of the upper LCD 22 and represents a predetermined button (button 14A) which is used for displaying next image among a plurality of stereoscopic images which have been taken.

As described above, in the one embodiment of the present invention, a first input information (input information by a touch operation, a button operation, or another operation) from the player is acquired and the parallax (the UI parallax) of the user interface is adjusted based on the first input information. In addition, a second input information (input information by the 3D adjustment switch 25 or the like) from the player is acquired and the parallax of the virtual space is adjusted based on the second input information. Then, a stereoscopic image (left and right images) including the images of the user interface, in which the parallax thereof is adjusted, and the images of the virtual space or a real space, in which the parallax thereof is adjusted, is generated. The generated stereoscopic image is then displayed on the display device capable of performing the stereoscopic display.

Further, in another embodiment, the above-described display control method may be applied, not limited to the hand-held game apparatus, but also to stationary game apparatuses and any electronic apparatus, for example, PDAs (Personal Digital Assistant), advanced mobile phones, personal computers connected to a display device capable of performing the stereoscopic display.

Further, in the present embodiment, the LCD capable of displaying the stereoscopic images which can be viewed by the naked eye is employed. In another embodiment, the present invention is applicable to viewing the stereoscopic images by glasses having the time division scheme or the deflecting scheme, the anaglyphic format (the red-blue glasses format), a format using a head-mounted display, or the like.

Further, in another embodiment, the processes may be divided and performed by a plurality of information processing apparatuses communicatively connected by wire or wirelessly to each other, and thereby the display control system, which realizes the above display control method, may be constructed. For example, a terminal being connected to an input device and a stereoscopic image display device may access a sever on the Internet and the server executes at least part of the processes described above. The server then returns the execution result to the terminal, and thereby a stereoscopic image may be displayed on the stereoscopic image display device on the terminal side.

Further, in the above embodiment, the processes in the flowcharts described above are performed by the information processing section 31 of the game apparatus 10 executing the predetermined program. In another embodiment, a part or the entirety of the processes may be performed by a dedicated circuit included in the game apparatus 10.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored therein a display control program executed by a computer of a display control apparatus for displaying a three-dimensional virtual space or real space on a display device configured to perform stereoscopic display, the display control program comprising instructions that cause the computer to:
   acquire first input information based on a first input provided by a user;
   acquire second input information based on a second input provided by the user that is different from the first input provided by the user;
   adjust a parallax of a first object, which is displayed on the display device, based on the acquired first input information and the acquired second input information;
   adjust a parallax of a second object displayed, which is displayed on the display device, based on the acquired second input information;
   generate a stereoscopic image including an image of the first object in which the parallax thereof is adjusted and an image of the second object in which the parallax thereof is adjusted; and
   display, on the display device, the generated stereoscopic image,
   wherein the parallax of the first object is adjusted in accordance with the acquired first input information and within a range that is determined based on the adjusted parallax of the second object,
   wherein, responsive to acquisition of the second input, the parallax of both the first and second object is adjusted while, responsive to acquisition of the first input, the parallax of the first object is adjusted, but the parallax of the second object is not adjusted.

2. The non-transitory computer-readable storage medium according to claim 1, wherein the instructions of the display control program further cause the computer to:
   set a reference value of the parallax of the first object in accordance with the parallax of the second object; and
   relatively change the reference value in accordance with the acquired first input information.

3. The non-transitory computer-readable storage according to claim 1, wherein the instructions of the display control program further cause the computer to:
   generate a first stereoscopic image in which the first object is rendered in accordance with the adjusted parallax of the first object; and
   generate a second stereoscopic image by taking images of the second object in the three-dimensional virtual space by a virtual stereo camera or taking images of the real space by a stereo camera, and
   the stereoscopic image including the image of the first object and the image of the second is generated by superimposing the first stereoscopic image with the second stereoscopic image.

4. The non-transitory computer-readable storage medium according to claim 3, wherein the first object is at least one displayed user interface element and the first stereoscopic image is generated by taking images of the at least one displayed user interface element using a UI virtual stereo camera.

5. The non-transitory computer-readable storage medium according to claim 4, wherein the parallax of the at least one displayed user interface element is adjusted by setting, based on the first input information, a distance between virtual cameras at the left and at the right which are components of the UI virtual stereo camera.

6. The non-transitory computer-readable storage medium according to claim 3, wherein the stereoscopic image including the image of the first object and the image of the second object is generated by superimposing the first stereoscopic image on a front side of the second stereoscopic image.

7. The computer-readable storage medium according to claim 1, wherein
   the parallax of the first object is adjusted by placing the first object in the three-dimensional virtual space, based on the first input information, and
   the stereoscopic image is generated by taking, by a virtual stereo camera, images of the three-dimensional virtual space in which the first object is placed.

8. The non-transitory computer-readable storage medium according to claim 7, wherein the instructions of the display control program further cause the computer to place a predetermined virtual object in the three-dimensional virtual space,
   wherein the stereoscopic image is generated, as if, when seen from the virtual stereo camera, the first object is positioned in front of the predetermined virtual object irrespective of the relative positioning of the first object to the predetermined virtual object within the virtual space.

9. The non-transitory computer-readable storage medium according to claim 1, wherein the instructions of the display control program further cause the computer to:
   display a reference display used in adjusting the parallax of the first object when the parallax of the first object is being adjusted.

10. The non-transitory computer-readable storage medium according to claim 9, wherein the instructions of the display control program further cause the computer to:
    display an auxiliary plane on the display device, as the reference display used in adjusting the parallax of the first object, the auxiliary plane indicating a display position of the first object in a direction perpendicular to a screen of the display device.

11. The non-transitory computer-readable storage medium of claim 1, wherein the first object is a user interface and the second object is an object that is located in the three-dimensional space or real space.

12. The non-transitory computer-readable storage medium of claim 1, wherein the parallax of the second object is adjusted independently of the acquired first input information.

13. The non-transitory computer-readable storage medium according to claim 1, wherein the display control program comprises further instructions that cause the computer to:
    generate a first image of the first object by using a first pair of virtual cameras, where a distance between the first pair of virtual cameras is set based on the first input information; and generate a second image of the second object by using a second pair of virtual cameras that is different from the first pair of virtual cameras, where a distance between the second pair of virtual cameras is set based on the second input information, where the generated stereoscopic image is based on a combination of the generated first and second images.

14. A display control apparatus for displaying a three-dimensional virtual space or real space on a display device configured to perform stereoscopic display, the display control apparatus comprising:

a processing system that includes at least one processor coupled to a memory, the processing system configured to:

acquire first input information based on a first input operation;

acquire second input information based on a second input operation that is different from the first input operation;

adjust a parallax of a first object, which is displayed on the display device, based on the acquired first input information;

adjust a parallax of a second object, which is displayed on the display device, based on the acquired second input information;

determine a parallax adjustment range based on the adjusted parallax of the second object;

generate a stereoscopic image including 1) an image of the first object in which the parallax thereof is adjusted and 2) an image of the second object in which the parallax thereof is adjusted; and output, to the display device, the generated stereoscopic image, wherein the parallax of the first object is adjusted based on a combination of the acquired first input information and the determined parallax adjustment range, wherein, responsive to acquisition of the second input, the parallax of both the first and second object is adjusted while, responsive to acquisition of the first input, the parallax of the first object is adjusted, but the parallax of the second object is not adjusted.

15. The display control apparatus of claim 14, wherein the first input operation and the second input operation are separately provided by a user of the display control apparatus.

16. The display control apparatus of claim 14, wherein an amount of adjustment for the parallax of the first object is different than an amount of adjustment for the parallax of the second object.

17. The display control apparatus of claim 14, wherein the processing system is further configured to:

execute a game program; and while the game program is being executed by the processing system, perform adjustments of the parallax of the first object and/or the perform adjustments of the parallax of the second object in accordance with the respective first and second input operations.

18. The display control apparatus of claim 14, wherein the image of the first object with the adjusted parallax and the image of the second object with the adjusted parallax thereof are simultaneously displayed on the display device as part of the generated stereoscopic image.

19. A display control system for displaying a three-dimensional virtual space or real space, the display control system comprising:

a display device; and a processing system coupled to the display device and including at least one processor coupled to a memory, the processing system configured to:

acquire first input information based on a first input provided by a user;

acquire second input information based on a second input provided by the user that is different from the first input;

adjust a parallax of a first object based on the acquired first input information and the acquired second input information;

adjust a parallax of a second object based on the acquired second input information; and generate a stereoscopic image including an image of the first object in which the parallax thereof is adjusted and an image of the second object in which the parallax thereof is adjusted, wherein the display device is configured to stereoscopically display the generated stereoscopic image, wherein the parallax of the first object is adjusted based on the acquired first input information and within a parallax range that is determined based on the adjusted parallax of the second object, wherein, responsive to acquisition of the second input, the parallax of both the first and second object is adjusted while, responsive to acquisition of the first input, the parallax of the first object is adjusted, but the parallax of the second object is not adjusted.

20. A display control method for use with a computing system that includes at least one processor coupled to a memory, the computing system coupled to a display device, the display control method comprising:

acquiring first input information based on a first input operation;

acquiring second input information based on a second input operation that is different from the first input operation;

adjusting a parallax of a first object based on the acquired first input information and the acquired second information;

adjusting a parallax of a second object based on the acquired second input information;

generating, using the computing system, a stereoscopic image that includes an image of first object in accordance with the parallax adjustment of the first object and an image of the second object in accordance with the parallax adjustment thereof; and displaying, to the display device that is configured to stereoscopically display images, the generated stereoscopic image, wherein the parallax of the first object is adjusted based on the acquired first input information and within a parallax range that is determined based on the adjusted parallax of the second object, wherein, responsive to acquisition of the second input, the parallax of both the first and second object is adjusted while, responsive to acquisition of the first input, the parallax of the first object is adjusted, but the parallax of the second object is not adjusted.

* * * * *